United States Patent
Kulathumani et al.

(10) Patent No.: US 12,499,482 B1
(45) Date of Patent: Dec. 16, 2025

(54) CUSTOMIZED RETAIL ENVIRONMENTS

(71) Applicant: Amazon Technologies, Inc., Seattle, WA (US)

(72) Inventors: Vinod Krishnan Kulathumani, Westborough, MA (US); Abhay Doke, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 506 days.

(21) Appl. No.: 17/955,393

(22) Filed: Sep. 28, 2022

(51) Int. Cl.
*G06Q 30/0601* (2023.01)
*G06Q 10/0631* (2023.01)
*G06Q 10/087* (2023.01)
*G06V 20/52* (2022.01)

(52) U.S. Cl.
CPC . *G06Q 30/0639* (2013.01); *G06Q 10/063114* (2013.01); *G06Q 10/087* (2013.01); *G06Q 30/0623* (2013.01); *G06V 20/52* (2022.01)

(58) Field of Classification Search
CPC ....... G06Q 30/0639; G06Q 10/063114; G06Q 10/087; G06Q 30/0623; G06V 20/52
See application file for complete search history.

(56) References Cited

U.S. PATENT DOCUMENTS

| | | | | |
|---|---|---|---|---|
| 9,117,106 B2 * | 8/2015 | Dedeoglu | ............... | G06V 20/64 |
| 9,235,928 B2 * | 1/2016 | Medioni | ................. | G06T 17/00 |
| 9,473,747 B2 * | 10/2016 | Kobres | ................. | G06Q 30/00 |
| 11,068,962 B1 * | 7/2021 | Grigsby | ................ | H04N 7/181 |
| 11,069,381 B1 * | 7/2021 | Prater | .................... | G11B 27/28 |
| 11,443,275 B1 * | 9/2022 | Prakash | .............. | G07G 1/0081 |
| 11,464,348 B2 * | 10/2022 | Cohn | .................. | G06Q 20/18 |
| 11,488,231 B1 * | 11/2022 | Dsouza | ................. | G06V 20/62 |
| 11,599,811 B1 * | 3/2023 | Savastinuk | ............ | G06N 5/041 |
| 11,620,822 B1 * | 4/2023 | Ron | ..................... | G06Q 20/208 |
| | | | | 382/103 |
| 11,636,457 B1 * | 4/2023 | De Bonet | ............ | G06Q 20/204 |
| | | | | 705/23 |
| 11,688,170 B2 * | 6/2023 | Stankovic | .............. | G06V 40/11 |
| | | | | 382/103 |
| 11,727,353 B2 * | 8/2023 | Adato | ................ | G06Q 10/0633 |
| 11,861,678 B1 * | 1/2024 | Grigsby | ................ | H04W 4/029 |
| 12,033,434 B1 * | 7/2024 | Doke | ..................... | H04N 23/61 |
| 12,100,218 B1 * | 9/2024 | Thi | ......................... | G06F 16/27 |
| 12,217,457 B1 * | 2/2025 | Miranda Artacho | .. | G06V 20/52 |
| 2013/0284806 A1 * | 10/2013 | Margalit | .............. | G07G 1/0009 |
| | | | | 235/382 |
| 2016/0148147 A1 * | 5/2016 | Gupta | ................ | G06Q 30/0643 |
| | | | | 705/7.15 |
| 2017/0355081 A1 * | 12/2017 | Fisher | .................. | G05D 1/0246 |

(Continued)

*Primary Examiner* — Michael Jared Walker
(74) *Attorney, Agent, or Firm* — Kilpatrick Townsend & Stockton LLP

(57) ABSTRACT

This disclosure describes, in part, systems for reporting and locating incidents within a facility using user-directed independently controlled devices. The systems and techniques provide for a user to report an incident through an interface of the independently controlled device, such as a smart shopping cart, and for the device to communicate with a facility management system to identify the location of the device within the facility. The location and the incident report may be communicated to have an associate of the facility address and remediate the incident without interrupting a customer's experience within the facility.

20 Claims, 7 Drawing Sheets

(56) References Cited

U.S. PATENT DOCUMENTS

| 2020/0151421 | A1* | 5/2020 | Adato | G06F 16/23 |
| 2022/0122155 | A1* | 4/2022 | Bronicki | G06V 10/765 |
| 2022/0383546 | A1* | 12/2022 | Bronicki | G06Q 30/0261 |

* cited by examiner

CUSTOMIZED RETAIL ENVIRONMENTS

BACKGROUND

Traditional physical stores maintain an inventory of items in customer-accessible areas such that customers can pick items from the inventory and take them to a cashier for purchase, rental, and so forth. For example, a customer may take an item, such as a shirt, from a rack located within the store. The customer may then take the shirt to a cashier that is located near an entrance of the store. Using a point-of-sale device, the cashier may process a transaction for a price of the shirt. For example, the cashier may input payment information, such as a card number, into the point-of-sale device, which may charge the card of the customer for the price of the shirt.

BRIEF DESCRIPTION OF FIGURES

The detailed description is set forth with reference to the accompanying figures. In the figures, the left-most digit(s) of a reference number identifies the figure in which the reference number first appears.

DETAILED DESCRIPTION

Figure 1:
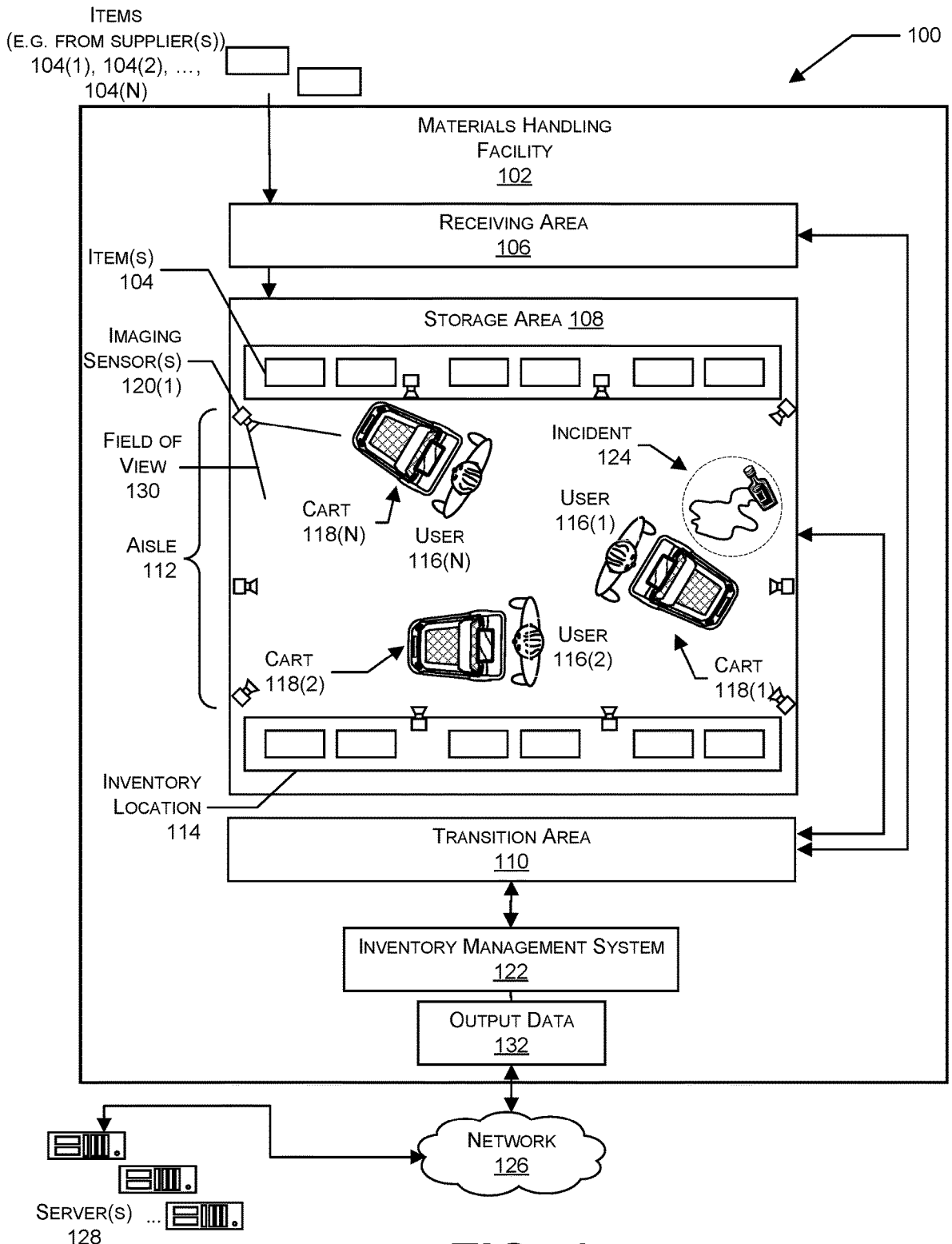
FIG. 1 illustrates an example of a materials handling facility with one or more mobile apparatuses operated therein for reporting incidents, the facility including sensors and an inventory management system configured to generate output regarding events occurring in the facility using the sensor data, according to at least one example.

This disclosure describes, in part, systems for enabling facilities (e.g., physical retail stores) to implement technology that is able to identify and leverage mobile apparatuses (e.g., carts) to gather data within the facility related to inventory and organizational matters. In a particular example, a reporting tool enabled by the systems described herein provides for individuals to submit and/or for mobile apparatuses to automatically submit incident reports related to inventory being out of stock (e.g., a customer-perceived out of stock such that items aren't visible on a shelf or inventory location), out of place, spilled, or otherwise disorganized. In some examples, the reporting tool may enable a user to easily report such information in a simple and accessible manner such that it may be reported to a management system or associate of the facility to address the incident (such as a spill).

In some examples, a location aware, or location tracked mobile apparatus that is navigated through a facility by a user may be used to report incidents within the facility. The incidents may include spills on a floor of the facility, items being out of place, items being out of stock or empty, or other such incidents. A user may submit an incident report through an interface of the mobile apparatus such that the location of the mobile apparatus may be combined with the incident report and submitted to a management system (e.g., server) of the facility. In this manner, the facility may direct resources to address the incident without requiring a user to find an associate or fill out a report to indicate the presence of such an incident.

In some examples, the mobile apparatus might include one or more sensors, such as cameras that can be configured to capture image data of the facility and recognize, through computer vision techniques, spills on the floor, empty shelves, disorganized shelves, items placed on the wrong shelf, etc. In some examples, the cameras and computer vision techniques may be configured to capture image data opportunistically as a user directs the mobile apparatus through the facility. The captured image data may be analyzed to identify incidents, such as the spills, empty shelves, and disorganization discussed herein.

In some examples, users pushing the mobile apparatus may provide inputs through a simple user interface to provide information on incidents without requiring computer vision techniques to identify the incidents. Accordingly, a button on the mobile apparatus, such as a physical button or a button on a user interface of the mobile apparatus or otherwise associated with the mobile apparatus (e.g., such as a user device carried by the user). The input from the customer may indicate that an incident is viewed by the user at the location of the mobile apparatus. The location of the mobile apparatus may be determined to identify the location of the incident.

In some examples, the location of the mobile apparatus may be determined using camera-based tracking techniques as described herein. In some examples, the location may be determined based on proximity of the mobile apparatus to RFID tags or visible markers within the facility, such as markers on a ceiling of the facility. In some examples, image data gathered by the mobile apparatus may be analyzed to identify a location. For instance, the image data may show shelves including items or objects that may be identified using computer vision techniques and thereby the location of the mobile cart may be identified based on proximity to the markers or tags. In some examples, the image data may be used in connection with a planogram of the facility such that items visible in the image data may be recognized and then corresponding locations may be found in the planogram data to identify a location in the facility.

The location of the mobile apparatus may be approximate, and may be within several meters of the incident. Because the incidents are visible to users, the location need not be highly accurate, as an associate directed to address the incident need only be directed to the rough area (within several meters) to be able to view and address the reported incident.

In some examples, the incident report from the mobile apparatus may be recorded in response to the user input, which may include an indication of the type of incident, a timestamp associated with the report, and other information, such as a type of spill (e.g., liquid or dry), an item out of place according to a planogram (e.g., planogram compliance), an inventory location out of items (e.g., needs restocking), and other such information. Some or all of the information included in the incident report may be identified by the mobile apparatus using computer vision techniques or other sensors (e.g., to identify items or liquid vs dry spills) may be automatically gathered in response to the user input.

After the incident report is generated by the mobile apparatus, it may be conveyed to a server or inventory management system of the facility such that an associate of the facility may be sent to address the incident.

In some examples, the incident report and/or location of the incident may have a corresponding confidence score. The confidence score may be based on a confidence of the location, such as a confidence that the location of the mobile apparatus is an accurate location. In some examples the confidence score may be associated with a likelihood that an incident exists (e.g., was the report an accidental button press by the user). In some examples, the system may corroborate or increase the confidence score by receiving incident reports from multiple mobile apparatuses before reporting the incident. For instance, a second mobile apparatus may generate an incident report at a second time (as compared with a first incident report from the first mobile apparatus at a first time) and the confidence score may be increased, or a second confidence score generated, in response to the location of the second mobile apparatus being within a threshold distance of the first mobile apparatus. In some examples the threshold may be less than a meter, while in some examples the threshold may be greater than a meter, including greater than two or greater than five meters.

In particular, this disclosure describes systems for use within the facility that use sensors of the facility as well as mobile apparatuses (such as sensor enabled shopping carts) to report incidents within the facility that need to be addressed, including planogram compliance issues, organizational issues, spills, or other such incidents.

The carts may enable a user to interact with a shopping companion, such as a digital assistant or electronic device throughout a shopping experience. The companion may be used to report an incident without manual pressing of a button, but by simply instructing the digital assistant to report the incident to the facility management system.

In some examples, the carts include sensors in addition to sensors associated with the facility, such as cameras, weight sensors, scanners, and other such sensors capable of generating data regarding items selected by users and otherwise tracking or locating items or carts within the facility. For example, the location of the carts may be determined using camera-based tracking techniques. In some examples, the location may be determined based on proximity of the mobile apparatus to RFID tags or visible markers within the facility, such as markers on a ceiling of the facility. In some examples, image data gathered by the carts may be analyzed to identify a location. For instance, the image data may show shelves including items or objects that may be identified using computer vision techniques and thereby the location of the carts may be identified based on proximity to the markers or tags. In some examples, the image data may be used in connection with a planogram of the facility such that items visible in the image data may be recognized and then corresponding locations may be found in the planogram data to identify a location in the facility.

The combination of facility sensors and cart sensors may be used to increase a confidence level associated with the location of the cart within the facility such that the location of the incident may be accurately reported for an associate to address.

The systems and techniques described herein provide for improvements over conventional approaches by enabling users directing independently controllable mobile devices within a facility to report, with minimal effort, an incident that needs to be addressed. The location of the incident may be provided by a tracking system of the facility that tracks the mobile device and/or by a location tracking system of the mobile device itself. In some examples, a user device (e.g., a smartphone) may be used to report the incident with a tracked location of the user associated with the user device (e.g., using a tracklet assigned to the user (with the user's consent)).

For more detail about the facility, customized retail facilities include inventory locations housing one or more items that may be ordered, received, picked, and/or returned by users. These inventory locations may be associated with one or more sensors configured to generate sensor data indicative of events that occur with respect to the items housed thereupon. For example, these sensors may generate sensor data indicative of a user (and/or associated of the facility) removing an item from the inventory location, returning the item to the inventory location, and/or the like. These sensors may include overhead cameras, in-shelf cameras, weight sensors, and/or any other type of sensor configured to generate sensor data indicative of user interactions with the items. An inventory management system (e.g., the system) may communicate with the sensors in order to receive the sensor data.

In some instances, the account of the user may be associated with a payment instrument of the user such that the payment instrument is able to be charged for items procured by the user, with the charge occurring automatically upon exit of the facility by the user and without the user needing to engage in a manual checkout process of the items. Accordingly, the facility may include an exit location where an exiting user provides information for identifying an account of the exiting user. The exit location may include a microphone, camera, or other sensor that generates sensor data at the request of the user for use in identifying the account of the exiting user.

Note that the facility may also include entry and exit locations at which users may enter and exit without providing identifying information. For instance, users may be allowed access to the facility in a manner similar to a traditional retail facility to allow users to shop or otherwise interact with items at the retail facility without needing to provide information for identifying user accounts. In some examples, the user may be allowed to enter the facility, then provide information for identifying a user account at an ordering location within the facility. Also, at least one exit location may resemble a traditional exit location at a retail facility, including an associate of the facility operating a point of sale (POS) device to manually check out the exiting user, such as an exiting user wishing to pay for items in cash. Of course, it is to be appreciated that the facility may include self-checkout kiosks or any other technology for enabling manual checkout of the items within the facility.

While navigating through the facility, the users may encounter spills or other organizational matters that should be addressed to ensure the facility is well organized, compliant with a planogram, and otherwise tidy. The users may use a smart shopping cart including a user interface, such as a screen, button, microphone, or other input device, to indicate the presence of an incident encountered at their current location. The location may be tracked according to the location of the smart shopping cart within the facility and included with an incident report sent to a facility management system.

While some of the examples below are described with reference to a materials handling facility (e.g., a brick-and-mortar retail store, a fulfillment center, etc.), the systems and techniques may be implemented for detecting events in any type of facility, an airport, a classroom, an outdoor environment, an amusement park, or any other location. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

As described herein, a threshold distance may include, but is not limited to, one meter, two meters, five meters, and/or any other distance. Additionally, a threshold period of time may include, but is not limited to, five minutes, ten minutes, thirty minutes, and/or any other time period.

FIG. 1 illustrates an example of a materials handling facility 100 with one or more mobile apparatuses operated therein for reporting incidents 124, the facility including sensors and an inventory management system configured to generate output regarding events occurring in the facility using the sensor data, according to at least one example. However, the following description is merely one illustrative example of an industry and environment in which the techniques described herein may be utilized. The materials handling facility 100 (or "facility") comprises one or more physical structures or areas within which one or more items 104(1), 104(2), ..., 104(Q) (also referred to as "items 104") may be held. As used in this disclosure, letters in parentheses such as "(Q)" indicate an integer result. The items 104 comprise physical goods, such as books, pharmaceuticals, repair parts, electronic gear, groceries, and so forth.

The facility 100 may include one or more areas designated for different functions with regard to inventory handling. In this illustration, the facility 100 includes a receiving area 106, a storage area 108, and a transition area 110. The receiving area 106 may be configured to accept items 104, such as from suppliers, for intake into the facility 100. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding or storing the items 104. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 100 to another.

One or more users 116(1), 116(2) (also referred to as "users 116")), totes 118(1), 118(2) (also referred to as "totes 118")) or other material handling apparatus may move within the facility 100. For example, the users 116 may move about within the facility 100 to pick or place the items 104 in various inventory locations 114, placing them on the totes 118 for ease of transport. A tote 118 is configured to carry or otherwise transport one or more items 104. For example, a tote 118 may include a basket, a cart, a bag, and so forth. In other implementations, other agencies such as robots, forklifts, cranes, aerial drones, and so forth, may move about the facility 100 picking, placing, or otherwise moving the items 104.

One or more sensors 120 may be configured to acquire information in the facility 100. The sensors 120 in the facility 100 may include sensors fixed in the environment (e.g., ceiling-mounted cameras) or otherwise, such as sensors in the possession of users (e.g., mobile phones, tablets, etc.). The sensors 120 may include, but are not limited to, sensors 120(1), weight sensors, radio frequency (RF) receivers, temperature sensors, humidity sensors, vibration sensors, and so forth. The sensors 120 may be stationary or mobile, relative to the facility 100. For example, the inventory locations 114 may contain sensors 120(1) configured to acquire images of pick or placement of items 104 on shelves, of the users 116(1) and 116(2) in the facility 100, and so forth. In another example, the floor of the facility 100 may include weight sensors configured to determine a weight of the users 116 or another object thereupon.

During operation of the facility 100, the sensors 120 may be configured to provide information suitable for tracking how objects move or other occurrences within the facility 100. For example, a series of images acquired by a sensor 120(1) may indicate removal of an item 104 from a particular inventory location 114 by one of the users 116 and placement of the item 104 on or at least partially within one of the totes 118.

During operation of the facility 100, the sensors 120 may also be configured to provide information suitable for tracking totes 118 within the facility 100. The location of the totes 118 may be used to identify locations of incidents 124 within the facility 100.

While the storage area 108 is depicted as having one or more aisles 112, inventory locations 114 storing the items 104, sensors 120, and so forth, it is understood that the receiving area 106, the transition area 110, or other areas of the facility 100 may be similarly equipped. Furthermore, the arrangement of the various areas within the facility 100 is depicted functionally rather than schematically. For example, multiple different receiving areas 1106, storage areas 1108, and transition areas 110 may be interspersed rather than segregated in the facility 100.

The facility 100 may include, or be coupled to, an inventory management system 122, which may perform some or all of the techniques described herein. For example, the inventory management system 122 may maintain a virtual cart of each user within the facility. The inventory management system 122 may also store a record associated with each user indicating an identifier associated with the user, the location of the user, and whether the user is eligible to exit the facility with one or more items without performing a manual checkout of the items. The inventory management system 122 may also generate and output notification data to the users and/or to associates of reported incidents.

As illustrated, the inventory management system 122 may reside at the facility 100 (e.g., as part of on-premises servers), on the servers 128 that are remote from the facility 100, a combination thereof. In each instance, the inventory management system 122 is configured to identify interactions and events with and between users 116, devices such as sensors 120, robots, material handling equipment, computing devices, and so forth, in one or more of the receiving area 106, the storage area 108, or the transition area 110. As described above, some interactions may further indicate the existence of one or more incidents 124, or predefined activities of interest. For example, incidents 124 may include spills, disorganization, non-compliance with a planogram, empty inventory locations, or other such incidents.

By determining the occurrence of one or more of the incidents 124, in response to an input from a user 116 through an interface of the totes 118 the inventory management system 122 may generate output data 132. The output data 132 comprises information about the incident 124. For example, where the incident 124 comprises a location, type of incident, items located in proximity to the incident that may have spilled (e.g., wet or dry products) and remediation steps for the incident 124. The occurrence of one or more incidents 124 may be identified through inputs received at user inputs of the totes 118, such as the user interfaces shown and described with respect to FIGS. 3-4.

The inventory management system 122 may use one or more automated systems to generate the output data 132. For example, an artificial neural network, one or more classifiers, or other automated machine learning techniques may be used to process the sensor data from the one or more sensors 120 to generate output data 132. For example, the inventory management system 122 may perform some or all of the techniques for generating and utilizing a classifier for identifying user activity in image data, as described herein. The automated systems may operate using probabilistic or non-probabilistic techniques. For example, the automated systems may use a Bayesian network. In another example, the automated systems may use support vector machines to generate the output data 132. The automated systems may generate confidence level data that provides information indicative of the accuracy or confidence that the output data 132.

In some examples, the incident report and/or location of the incident may have a corresponding confidence score. The confidence score may be based on a confidence of the location, such as a confidence that the location of the mobile apparatus is an accurate location. In some examples the confidence score may be associated with a likelihood that an incident exists (e.g., was the report an accidental button press by the user). In some examples, the system may corroborate or increase the confidence score by receiving incident reports from multiple mobile apparatuses before reporting the incident. For instance, a second mobile apparatus may generate an incident report at a second time (as compared with a first incident report from the first mobile apparatus at a first time) and the confidence score may be increased, or a second confidence score generated, in response to the location of the second mobile apparatus being within a threshold distance of the first mobile apparatus. In some examples the threshold may be less than a meter, while in some examples the threshold may be greater than a meter, including greater than two or greater than five meters.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 80%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

Continuing the example, a subset of the sensor data may comprise a video clip acquired by one or more sensors 120(1) and/or sensors of the totes 118 in response to the user input at the totes 118. The tentative results may comprise the "best guess" as to which items 104 may have been involved in the incident 124. For example, the tentative results may comprise results determined by the automated system that have a confidence level above a minimum threshold.

The facility 100 may be configured to receive different kinds of items 104 from various suppliers and to store them until a customer orders or retrieves one or more of the items 104. A general flow of items 104 through the facility 100 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 100. The receiving of the items 104 may comprise one or more incidents 124 for which the inventory management system 122 may generate output data 132.

Upon being received from a supplier at receiving area 106, the items 104 may be prepared for storage. For example, items 104 may be unpacked or otherwise rearranged. The inventory management system 122 may include one or more software applications executing on a computer system to provide inventory management functions based on events associated with the unpacking or rearrangement. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 100, those items 104 may be stored in several different inventory locations 114 to reduce congestion that might occur at a single inventory location 114. Storage of the items 104 and their respective inventory locations 114 may comprise one or more incidents 124. In some instances, device(s) may be placed on one or more of the items 104, where the devise(s) are used to track the one or more items 104 while within the facility 100, as described herein.

When a customer order specifying one or more items 104 is received, or as a user 116 progresses through the facility 100, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 100 picking items 104 from inventory locations 114 within the storage area 108, and placing those items 104 into a tote 118. In other implementations, employees of the facility 100 may pick items 104 using written or electronic pick lists derived from customer orders. These picked items 104 may be placed into the tote 118 as the employee progresses through the facility 100. Picking may comprise one or more events, such as the user 116 in moving to the inventory location 114, retrieval of the item 104 from the inventory location 114, and so forth.

After items 104 have been picked, they may be processed at a transition area 110. The transition area 110 may be any designated area within the facility 100 where items 104 are transitioned from one location to another or from one entity to another. For example, the transition area 110 may be a packing station within the facility 100. When the item 104 arrives at the transition area 110, the items 104 may be transitioned from the storage area 108 to the packing station. The transitioning may comprise one or more events. Information about the transition may be maintained by the inventory management system 122 using the output data 132 associated with those events.

In another example, if the items 104 are departing the facility 100 a list of the items 104 may be obtained and used by the inventory management system 122 to transition responsibility for, or custody of, the items 104 from the facility 100 to another entity. For example, a carrier may accept the items 104 for transport with that carrier accepting responsibility for the items 104 indicated in the list. In another example, a customer may purchase or rent the items 104 and remove the items 104 from the facility 100. The purchase or rental may comprise one or more events.

The inventory management system 122 may access or generate sensor data about the facility 100 and the contents therein including the items 104, the users 116, the totes 118, and so forth. The sensor data may be acquired by one or more of the sensors 120, data provided by other systems, and so forth. For example, the sensors 120 may include sensors 120(1) configured to acquire image data of scenes in the facility 100. The image data may comprise still images, video, or a combination thereof. The image data may be processed by the inventory management system 122 to determine a location of the user 116, the tote 118, the identifier associated with the user 116, and so forth. As used herein, the identifier associated with the user may represent a unique identifier of the user (e.g., number associated with user, username, etc.), an identifier that distinguishes the user amongst other users being located within the environment, or the like.

The inventory management system 122, or systems coupled thereto, may be configured to determine the identifier associated with the user 116, as well as to determine other candidate users. In one implementation, this determination may comprise comparing sensor data with previously stored identity data. For example, the identifier associated with the user 116 may be identified by presenting a token carrying authentication credentials, providing a fingerprint, scanning a barcode or other type of unique identifier upon entering the facility, and so forth. The identifier associated with the user 116 may be determined before, during, or after entry to the facility 100. Determination of the user's identifier may comprise comparing sensor data associated with the user 116 in the facility 100 to previously stored user data.

In some instances, the inventory management system 122 groups users within the facility into respective sessions. That is, the inventory management system 122 may utilize the sensor data to determine groups of users that are effectively "together" (e.g., shopping together). In some instances, a particular session may include multiple users that entered the facility 100 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in her tote 118. Noting the child and the mother as belonging to the same session may increase the chances of successfully adding the box of cereal to the virtual shopping cart of the mother.

In some examples, the location of the totes 118 and/or users 116 may be determined using camera-based tracking techniques as described herein. In some examples, the location may be determined based on proximity of the totes 118 to RFID tags or visible markers within the facility 100, such as markers on a ceiling of the facility 100. In some examples, image data gathered by the mobile apparatus may be analyzed to identify a location. For instance, the image data may show shelves including items or objects that may be identified using computer vision techniques and thereby the location of the totes 118 may be identified based on proximity to the markers or tags. In some examples, the image data may be used in connection with a planogram of the facility 100 such that items visible in the image data may be recognized and then corresponding locations may be found in the planogram data to identify a location in the facility 100.

Figure 2:
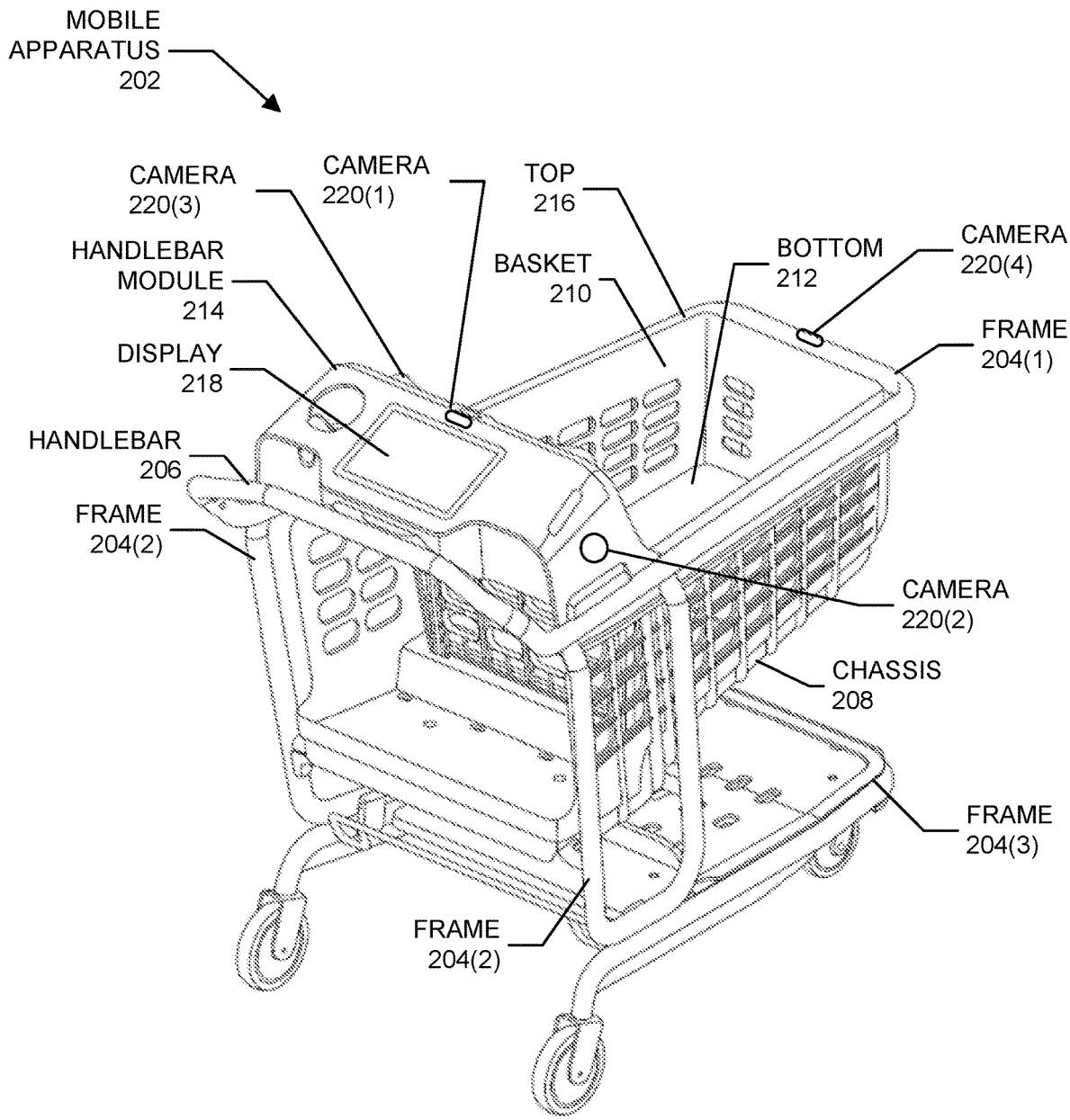
FIG. 2 illustrates an example of a mobile apparatus for reporting incidents within a materials handling facility, according to at least one example.

FIG. 2 illustrates an example of a mobile apparatus 202 for identifying items, in accordance with examples of the present disclosure. The mobile apparatus 202 may include a main frame 204(1)-(3) (also referred to as a "main frame 204"). As shown, the main frame 204 may include at least a top portion 204(1), side portions 204(2), and a bottom portion 204(3). The top portion of the main frame 204(1) may also include a handlebar 206 that a user uses to push the mobile apparatus 202. The main frame 204 may be made of plastic, wood, metal, composites, or any other material and/or combinations of materials. As shown, the main frame 204 may include, and/or support, the other components of the mobile apparatus 202.

For example, the main frame 204 (e.g., the bottom portion 204(4)) may support a chassis 208. The chassis 208 may include any shape, such as an "X" shape, a square, a circle, a triangle, and/or the like, and support one or more sensors of the mobile apparatus 202. For example, the chassis 208 may include the "X" shape that supports a weight sensor, where a first loadcell of the weight sensor is disposed proximate to a first end of the chassis, a second loadcell of the weight sensor is disposed proximate to a second end of the chassis, a third loadcell of the weight sensor is disposed proximate to a third end of the chassis, and a fourth loadcell of the weight sensor is disposed proximate to a fourth end of the chassis. While this example describes the weight sensor as include four loadcells, in other examples, the chassis 208 may include any number of loadcells. Additionally, the chassis 208 may be made of plastic, wood, metal, composites, or any other material and/or combinations of materials.

The chassis 208 may further include, and/or support, a basket 210. The basket 210 may comprise a bottom 212 having a given shape (e.g., a quadrilateral shape, a circular shape, a triangular shape, etc.), sides protruding from the bottom 212 to define a receptacle, and a top 216 having a perimeter that defines an opening of the receptacle to receive items that are placed within the basket 210. The sides of the basket 210 (as well as a gate described below) include a ribbed pattern. As shown, the ribbed pattern may include openings that are rectangular in shape, but with circular ends. However, in other examples, the openings may include any other shape. The sides of the basket further include protrusions that extend from the bottom 212 of the basket 210 to the top 216 of the basket 210 and/or laterally along the sides of the basket 210.

The mobile apparatus 202 may further include a handlebar module 214 that is coupled to the main frame 204. The handlebar module 214 may include one or more sensors (e.g., camera(s) 220(1)-(3), scanner(s), proximity sensor(s), motion sensor(s), etc.), one or more lights, a display 218218, and/or any other type of electronic device. The handlebar module 214 may include an opening for receiving a removable battery that provides power to the electrical components of the mobile apparatus 202.

The mobile apparatus 202 may include an upward facing camera 220(1) to view markers or indicators on a ceiling of a facility to determine a location of the mobile apparatus 202 within the facility based on visible markers, side facing camera(s) 220(2) pointed outward from the sides of the mobile apparatus 202, basket facing camera(s) 220(3) directed towards the basket 210, a front facing camera 220(4), and other such cameras. In some examples, one or more of the cameras 220 may capture image data directed into the basket 210, upwards (towards the ceiling), towards the sides of the mobile apparatus 202, or towards the front or rear of the mobile apparatus 202. The cameras may be used to capture image data of the surrounding environment, as described herein, such as to identify empty inventory locations and/or to identify locations or incidents via the mobile apparatus 202.

The mobile apparatus 202 may also include the display 218218 configured to display content represented by image data, such as pictures, videos, user interface elements, and/or any other image data. The display 218218 may comprise any type of display 218, and may further be a touch screen to receive touch input from a user, such as shown and described with respect to FIGS. 3-4. As shown and described herein, a button or interface of the display 218 may enable a user to report an incident within a facility and/or to provide additional context or information regarding the incident, while the location of the incident is determined based on the location of the mobile apparatus.

In some examples, the mobile apparatus 202 may include a bar that is configured to protect one or more components of the mobile apparatus 202, such as the handlebar module 214. The bar may extend between at least the side portions 204(2) of the main frame 204. As such, and in some examples, the bar may be configured to protect the handlebar module 214 by preventing the gate from contacting the handlebar module 214 when the gate moves between the first position and the second position. Additionally, in some examples, the bar may be configured to protect the handlebar module 214 by preventing an additional basket of an additional mobile apparatus from contacting the handlebar module 214, such as when the mobile apparatuses are nested.

The main frame 204 of the mobile apparatus 202 may be connected to a bottom frame 204(3) that includes components for providing mobility to the mobile apparatus 202. For instance, the bottom frame 204(3) may support wheel castors (also to enable movement of the mobile apparatus 202 along a surface. The wheel casters may include wheels, axles, forks, joints or other components which enable the mobile apparatus 202 to travel on various surfaces. For instance, in some examples each of the wheel casters may include a single wheel provided on an axle within a fork, or two or more wheels provided on such an axle. In some other examples, the wheel casters may include two or more axles. Alternatively, in still other examples, a single caster may be provided in lieu of the multiple wheel casters.

Figure 3:
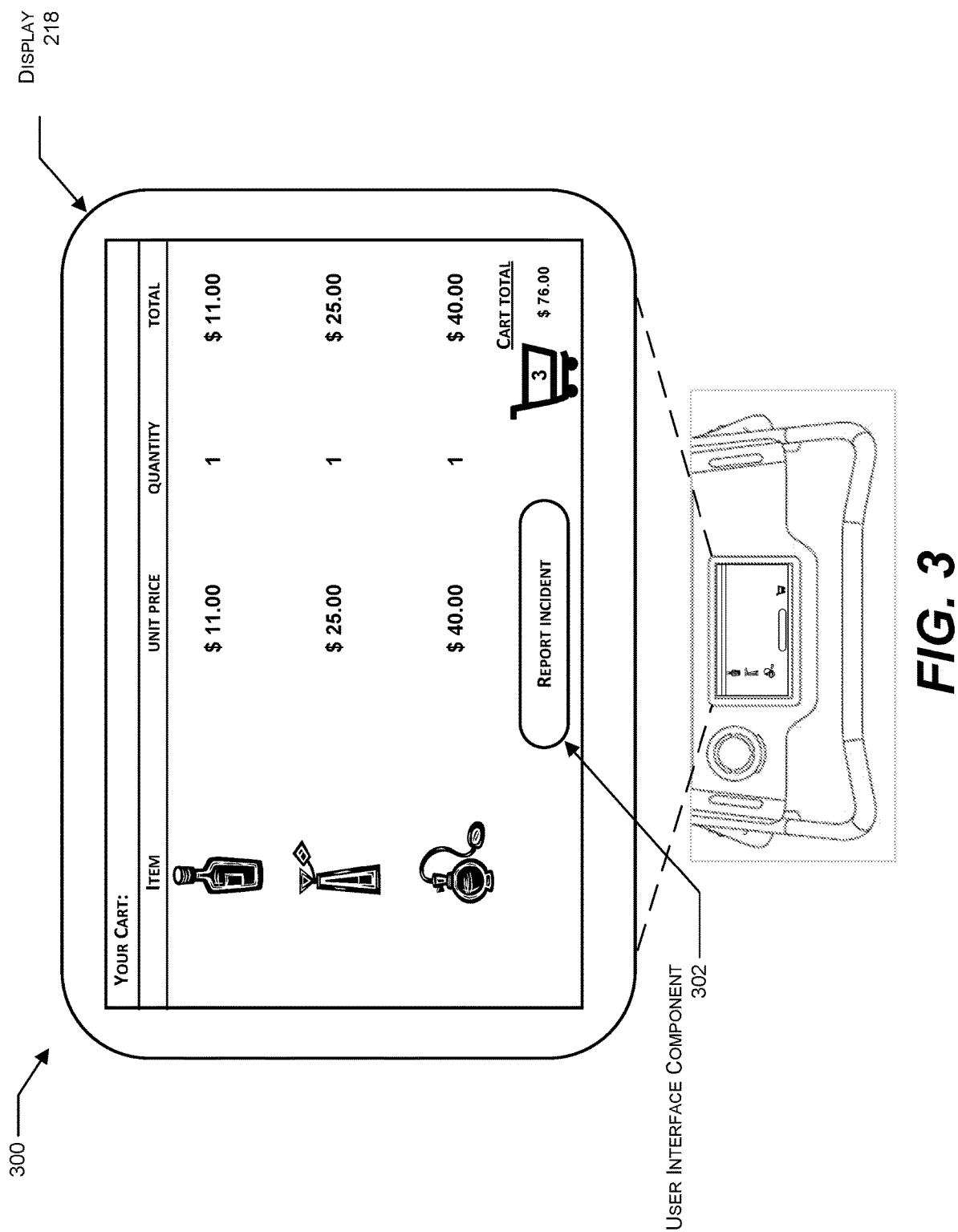
FIG. 3 illustrates an example user interface of a user-facing module showing user interaction options to report an incident, according to at least one example.
Figure 4:
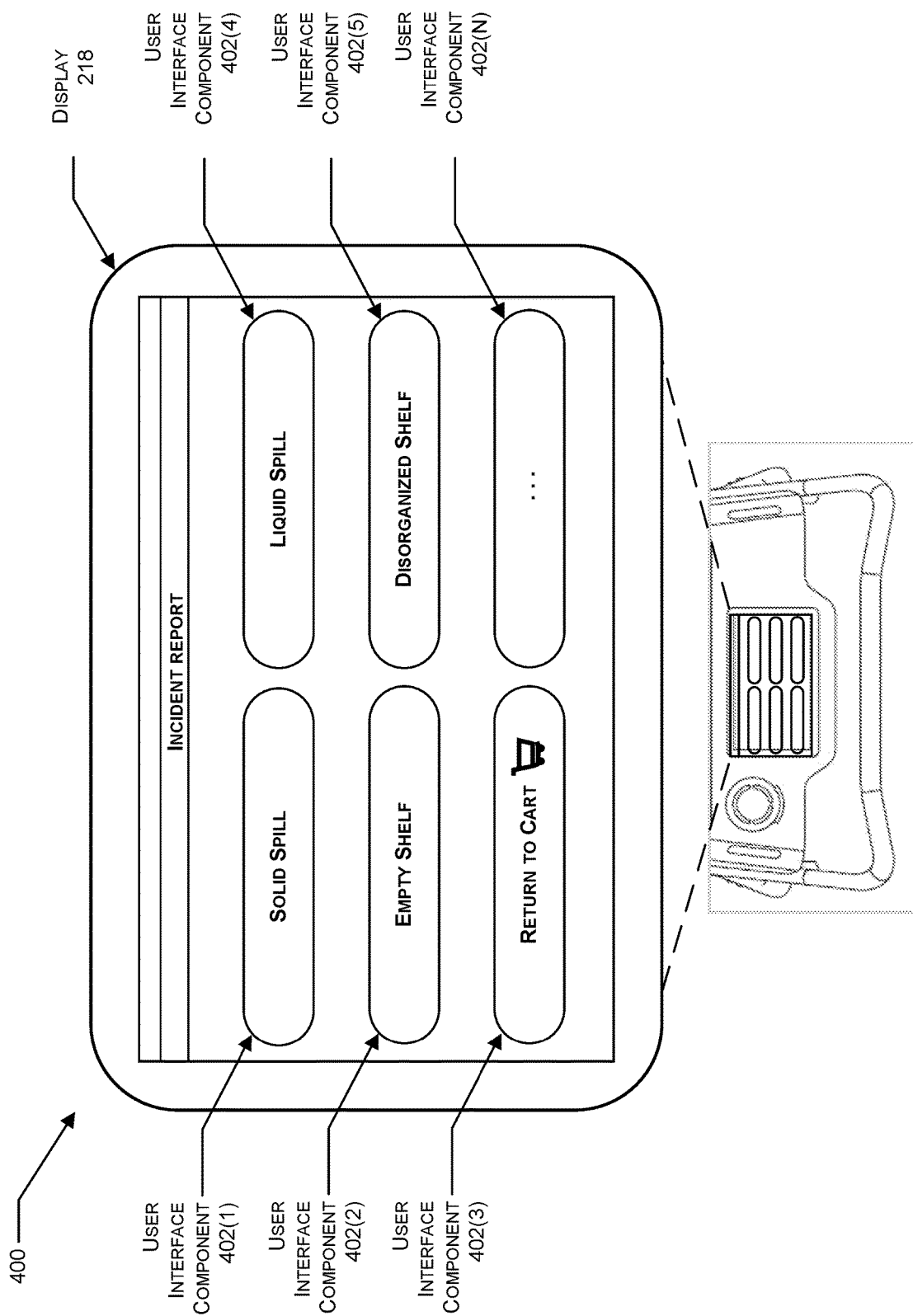
FIG. 4 illustrates an example user interface of a user-facing module showing user interaction options to report a particular incident, according to at least one example.

FIGS. 3-4 illustrate example user interfaces of a user-facing module, such as the display 218 of the mobile apparatus 200. The display 218 may be built-in to the mobile apparatus 200 or may include a display of an associated device, such as a user device of a user pushing the mobile apparatus 200.

FIG. 3 illustrates a user interface 300 of a user-facing module showing user interaction options, according to at least one example. The user interface 300 includes information that may enable a user to report an incident within a facility, as described herein, as well as providing information regarding cart contents. For example, the user interface 300 may provide users with an ability to check prices, view detailed product information, reviews, research products, locate items within the facility, place orders for items (such as items to be prepared e.g., custom weight items for meat products or cooked items), receive notifications, view tracking history, purchase history, view a shopping list, and receive personalized notifications during their shopping experience in addition to reporting an incident using the user interface component 302.

The user interface component 302 may be representative of one or more different input devices or systems for alerting the facility, via the mobile apparatus 200, of an incident. The user interface component 302 may be activated by a single click that reports an incident at the location and time of the click. In some examples, the user interface component 302 may be selected to initially report and incident, and the user interface 300 may then transition to the user interface 400 of FIG. 4 where additional options may be presented for the user to provide additional information regarding the incident. In some examples, the facility and/or the device may also convey the alert to other devices in proximity, such as other carts within a threshold distance of the incident location such that the users of such carts may be aware of a potentially slippery floor.

In some examples, the incidents reported via the mobile apparatus 202 may be broadcast to other mobile apparatuses and/or devices. In some examples, the incidents may be broadcast to all other mobile apparatuses operating within the facility and/or only mobile apparatuses operating within a threshold distance of the incident location. In some examples the incident report may be broadcast to other mobile apparatuses based on a type of the incident. For example, incident reports of spills may be reported to other mobile apparatuses so as to provide visual or audible warnings of the incident to users, while in some instances other types of incidents, such as empty inventory locations may not be broadcast to other mobile apparatuses.

In some examples, the incident reports may be broadcast based on control by a manager of the facility, such that the manager may determine particular incidents to broadcast and others to not broadcast. In addition, the manager (e.g., the facility management system), may enable canceling of incident reports across a fleet of mobile devices. For example, a particular incident may be reported to a fleet of mobile devices, that sync incident reports with the facility manager, and subsequently, upon the incident being addressed, the facility manager may clear the incident report across the mobile apparatuses. In some examples, individual users may be able to cancel an incident report either submitted by themselves or notified on their display 218, such as when the user encounters an incident location, but the incident has been resolved. In such examples, the user may be able to clear the incident report as resolved and sync the resolution of the incident report with the facility manager and the fleet of mobile apparatuses.

FIG. 4 illustrates a user interface 400 of a user-facing module (e.g., display 218) showing options for reporting an incident including incident type information. The user interface 400 includes user interface components 402(1), 402(2), 402(3), 402(4), 402(5), and 402(N) whereby a user may provide information regarding an observed incident within the facility.

In the user interface 400, the user, after selecting to report an incident at user interface 300, has options to report a solid spill (user interface component 402(1)) such as a spill of dry items (e.g., dog food), report a liquid spill (user interface component 402(4)), report an empty shelf (user interface component 402(2)) which may also include reporting a particular item is out of stock on the shelf though the entire shelf may not be empty due to other products still being present, report a disorganized shelf (user interface component 402(5)), return to the cart (user interface component 402(3)) which may or may not include causing the report to be sent (e.g., in some instances the incident report may be generated upon selecting user interface component 302 while in some instances the report may not be generated until the user selects an option of user interface 400), and selection of other options (user interface component 402(N)) that may enable the user to provide further information or customizable inputs.

Figure 5:
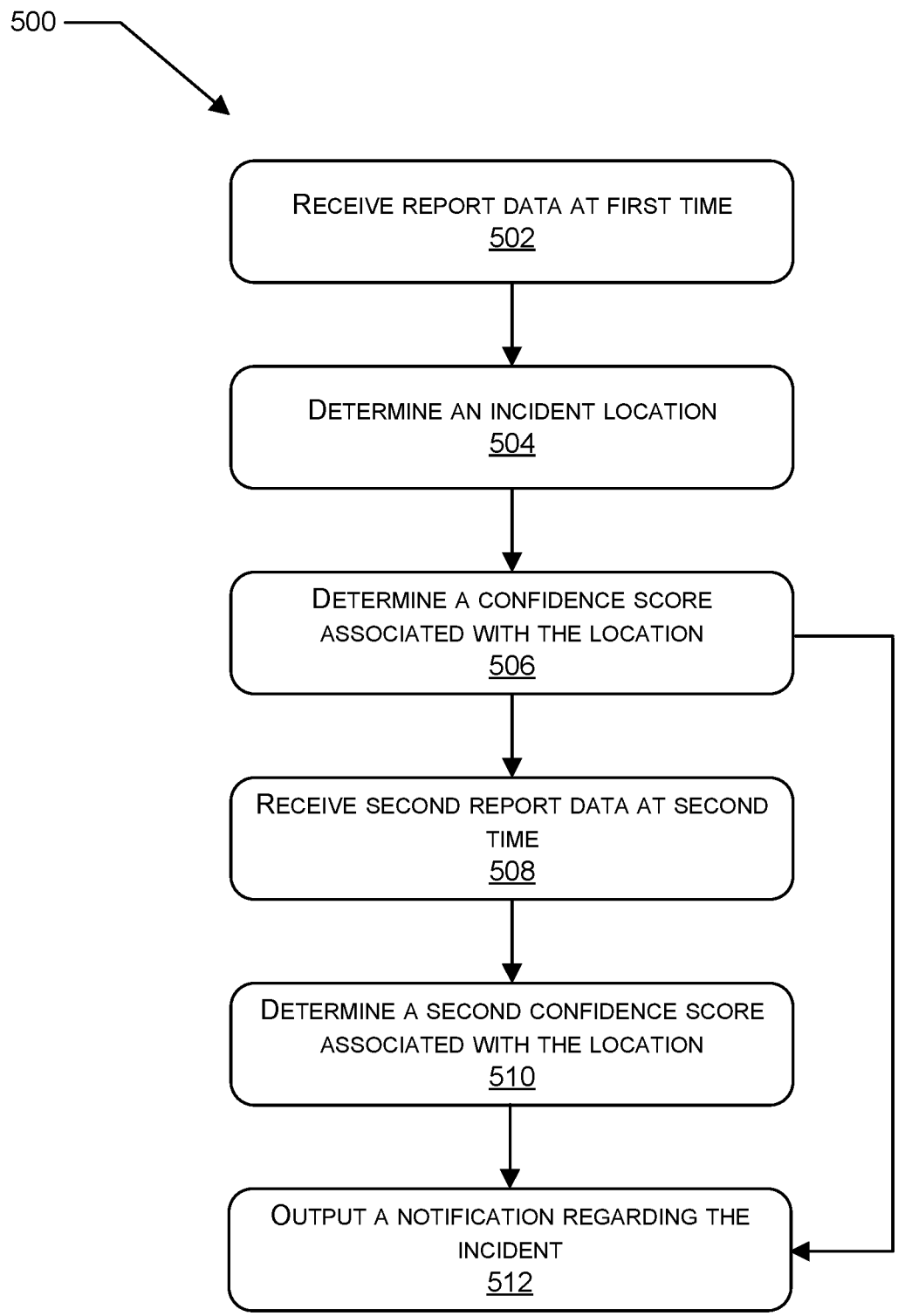
FIG. 5 illustrates an example process for reporting and acting on incident reports, according to at least one example.

FIG. 5 illustrates a process for implementing AC techniques for customers of facilities. The processes described herein are illustrated as collections of blocks in logical flow diagrams, which represent a sequence of operations, some, or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 5 illustrates an example process 500 for reporting and acting on incident reports, according to at least one example. At 502, the process 500 includes receiving report data at a first time. The report data may include receiving a user input, such as a user selecting a button of a user interface of a shopping cart or other mobile device, such as depicted with respect to FIGS. 3-4 herein. The report data may also be in response to a user inputting data through some other user input device including a microphone, digital assistant, user device, or other such user interface component. The report may include a report of an incident. In some examples, the report may include additional data such as the type of incident or information related to items in proximity to the incident, which may be determined based on the incident location determined at 504. In some examples, the report may include image data or other sensor data gathered by sensors of the mobile apparatus 202 and/or sensors of a facility at or around the incident location.

At 504, the process 500 includes determining an incident location. The incident location may be determined based on the location of the mobile apparatus used to report the incident. Accordingly, the incident location may be determined by first determining the location of the mobile apparatus and subsequently identifying the incident location in proximity to the location of the mobile apparatus. The location of the mobile apparatus may be determined as described herein based on sensor data gathered by sensors of the facility and/or based on sensors of the shopping cart, such as image sensors, motion sensors, GPS location sensors, RFID sensors, and the like. The incident location may be used as the location of the mobile apparatus, and/or a determined location based on the sensor data, such as identifying an inventory location using image data to identify a location where a shelf is out of stock.

At 506, the process 500 includes determining a confidence score associated with the location. The confidence score may be based on a confidence of the location, such as a confidence that the location of the mobile apparatus is an accurate location. In some examples the confidence score may be associated with a likelihood that an incident exists (e.g., was the report an accidental button press by the user). In some examples, the system may corroborate or increase the confidence score by receiving incident reports from multiple mobile apparatuses before reporting the incident. For instance, a second mobile apparatus may generate an incident report at a second time (as compared with a first incident report from the first mobile apparatus at a first time) and the confidence score may be increased, or a second confidence score generated, in response to the location of the second mobile apparatus being within a threshold distance of the first mobile apparatus. In some examples the threshold may be less than a meter, while in some examples the threshold may be greater than a meter, including greater than two or greater than five meters.

At 508, the process 500 includes receiving second report data at a second time. For instance, a second mobile apparatus may generate an incident report at a second time (as compared with a first incident report from the first mobile apparatus at a first time, with the second time being later than the first time).

At 510, the process 500 includes determining a second confidence score associated with the location. The second confidence score may be increased, or a second confidence score generated, in response to the location of the second mobile apparatus being within a threshold distance of the first mobile apparatus. In some examples the threshold may be less than a meter, while in some examples the threshold may be greater than a meter, including greater than two or greater than five meters.

At 512, the process 500 includes outputting a notification regarding the incident. The output notification comprises information about the incident. For example, where the incident report comprises a location, type of incident, items located in proximity to the incident that may have spilled (e.g., wet or dry products) and remediation steps for the incident. In some examples the remediation steps may be determined based on the identified incident type, and may include information such as mopping, sweeping, restocking particular items, and the like.

Figure 6:
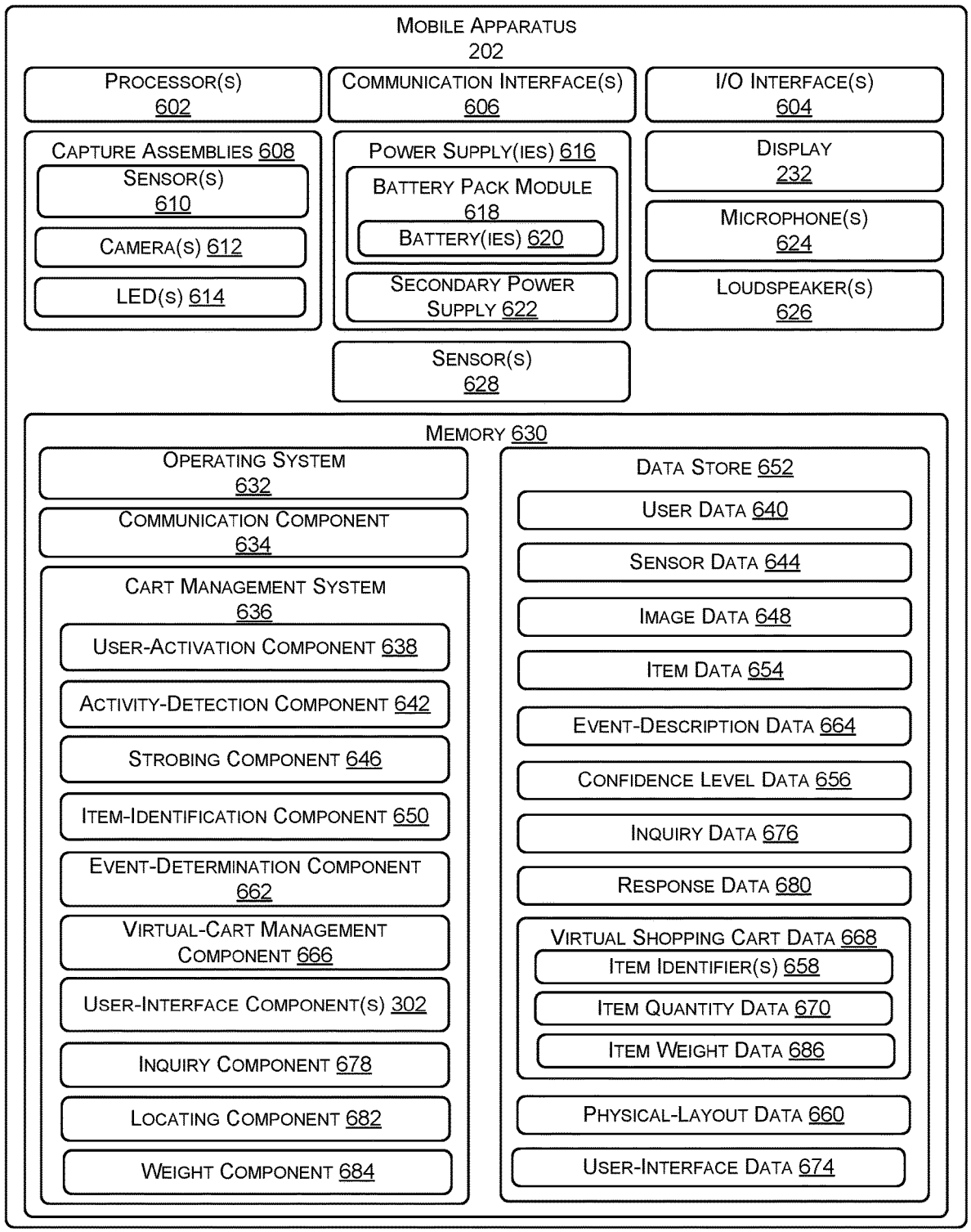
FIG. 6 illustrates example components of a mobile apparatus configured to support at least a portion of the functionality of an incident reporting system, according to at least one example.
Figure 7:
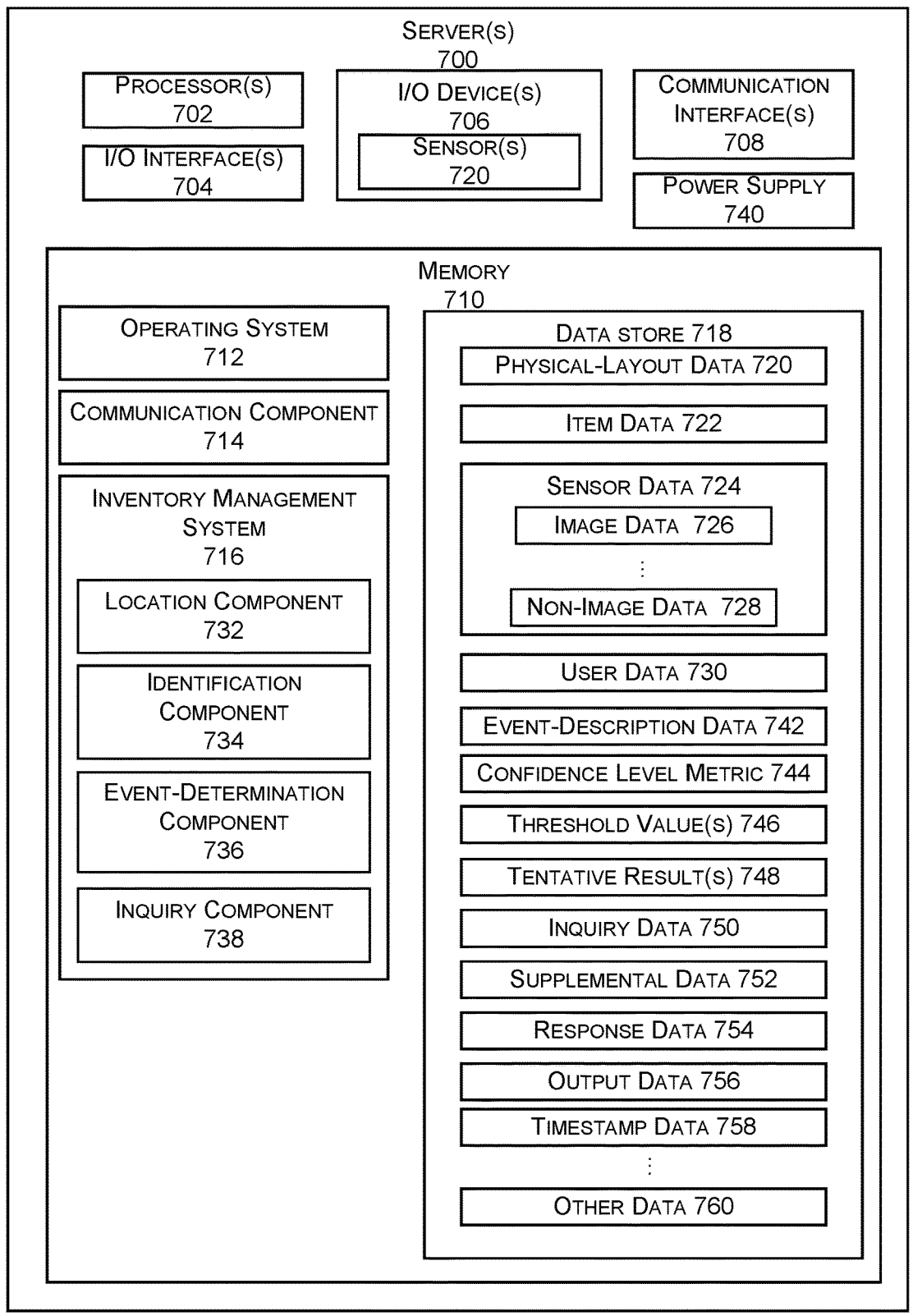
FIG. 7 illustrates a block diagram of one or more servers configured to support operation of the facility, according to at least one example.

FIG. 6 illustrates example components of a mobile apparatus configured to support at least a portion of the functionality of an incident reporting system, according to at least one example.

The mobile apparatus 202 may include one or more hardware processors 602 (processors) (which may represent, and/or include, the processor(s) 602) configured to execute one or more stored instructions. The processor(s) 602 may comprise one or more cores. The mobile apparatus 202 may include one or more I/O interface(s) 604 to allow the processor(s) 602 or other portions of the mobile apparatus 202 to communicate with other devices. The I/O interface(s) 604 may comprise Inter-Integrated Circuit (I2C), Serial Peripheral Interface bus (SPI), Universal Serial Bus (USB) as promulgated by the USB Implementers Forum, and so forth. The I/O interface(s) 604 may allow the various modules/components to communicate with each other and/or control each other.

The mobile apparatus 202 may also include one or more communication interfaces 606 (which may represent, and/or include, the communication interface(s) 706). The communication interface(s) 606 are configured to provide communications between the mobile apparatus 202 and other devices, such as the server(s), sensors, interface devices, routers, and so forth. The communication interface(s) 606 may include devices configured to couple to personal area networks (PANs), wired and wireless local area networks (LANs), wired and wireless wide area networks (WANs), and so forth. For example, the communication interfaces 606 may include devices compatible with Ethernet, Wi-Fi™, and so forth. The mobile apparatus 202 may also include one or more busses or other internal communications hardware or software that allow for the transfer of data between the various modules and components of the mobile apparatus 202.

The mobile apparatus 202 may also include the one or more capture assemblies 608 (which may represent, and/or include, the one or more capture assemblies) that each include one or more sensors 610, a camera 612, and one or more LEDs 614. In some examples, the sensor(s) 610 may comprise any type of sensor that is able to detect the presence of nearby objects without the need for physical contact (e.g., ToF sensor(s), PIR sensor(s), capacitive sensor(s), etc.). The cameras 612 in each of the capture assemblies 608 may comprise any type of camera or imaging device configured to generate image data (and/or video data), or information descriptive of a plurality of picture elements or pixels. The LED(s) 614 may be selectively activated to emit light at any wavelength, visible or non-visible to users. In some examples, one or more capture assemblies 608 may additionally, or alternatively, be facing downward into the basket 210 of the mobile apparatus 202. Additionally, the mobile apparatus 202 may include one or more cameras 612 that are outward facing in that generate image data representing the facility around the mobile apparatus 202.

The mobile apparatus 202 may include one or more power supply(ies) 616 to provide power to the components of the mobile apparatus 202, such as a battery pack module 618 (e.g., the battery), which include one or more batteries 620. The power supply(ies) 616 may also include a secondary (e.g., internal) power supply 622 to allow for hot swapping of battery pack modules 618, such as one or more capacitors, internal batteries, etc.

The mobile apparatus 202 may also include the display 218 configured to display content represented by image data, such as pictures, videos, user interface elements, and/or any other image data. The display 218 may comprise any type of display 218, and may further be a touch screen to receive touch input from a user. The mobile apparatus 202 may also include one or more microphones 624 (which may represent, and/or include, the microphone(s)) and one or more loudspeakers 626 (which may represent, and/or include, the loudspeaker(s)) to facilitate a dialogue with a user, and/or to receive feedback from the user. The microphone(s) 624 may capture sound representing the user's speech, and the loudspeaker(s) 626 may output machine-generated words to facilitate a dialogue, prompt a user for feedback on an item and/or for other information, and/or output other alerts or notifications.

The mobile apparatus 202 may also include other types of sensor(s) 628 (which may represent, and/or include, the sensor(s) 728). As described herein, these sensor(s) may include weight sensor(s) with loadcell(s), where, in some examples, the loadcell(s) are located between the basket 210 and the chassis 208.

The mobile apparatus 202 may include one or more memories 630 (which may represent, and/or include, the memory). The memory 630 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 630 provides storage of computer-readable instructions, data structures, program modules, and other data for the operation of the mobile apparatus 202. A few example functional modules are shown stored in the memory 630, although the same functionality may alternatively be implemented in hardware, firmware, or as a system on a chip (SOC).

The memory 630 may include at least one operating system (OS) component 632. The OS component 632 is configured to manage hardware resource devices such as the I/O interface(s) 604, the communication interface(s) 606, and provide various services to applications or components executing on the processor(s) 602. The OS component 632 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 630. These components may be executed as foreground applications, background tasks, daemons, and so forth. A communication component 634 may be configured to establish communications with one or more of the sensors, one or more of the servers, or other devices. The communications may be authenticated, encrypted, and so forth.

The memory 630 may further store a cart management system 636. The cart management system 636 is configured to provide the item-identifying functions (and other functions) provided by the mobile apparatus 202 as described herein. For example, the cart management system 636 may be configured to detect items, identify items, and maintain a virtual shopping cart for a user of the mobile apparatus 202.

The cart management system 636 may include a user-activation component 638 that performs operations for activating a shopping session using the mobile apparatus 202 on behalf of a user. For instance, a user may have previously registered for a user account with an operator of the facility to utilize various automated management services provided by an operator of the facility. The user may have registered for a user account, such as by providing user data 640, to automate payments made for items taken by the user and included a payment means (e.g., credit card, bank account number, etc.), and may have also provided an identification means in the user data 640 to the user-activation component 638 such that the mobile apparatus 202 can recognize the user. For instance, the user may have registered to identify themselves to the mobile apparatus 202 using any identification technique by the user-activation component 638, such as by providing the user data 640 by presenting an identification means to a camera/scanner 612 (e.g., presenting a driver's license, presenting a facility-issued card, presenting a user identifier via a mobile phone, etc.), and/or speaking a predefined utterance that is captured by the microphone(s) 624 (e.g., a name of the user, a predefined keyword, etc.). Once a user has identified themselves using the user-activation component 638, the user-activation component 638 may open a shopping session where the mobile apparatus 202 identifies and track items retrieved by the user and placed in the mobile apparatus 202.

The cart management system 636 may additionally include an activity-detection component 642 configured to detect items (or objects) within a particular proximity to the mobile apparatus 202. For example, the capacitive sensor(s) 628 may generate sensor data 644. The activity-detection component 642 may then analyze the sensor data 644 in order to determine a capacitance detected by the capacitive sensor(s) 628. Additionally, the activity-detection component 642 may use the capacitance to perform one or more of the processes described herein to detect the presence of a user. For example, the activity-detection component 642 may use the capacitance to determine if the user is located proximate to the mobile apparatus 202, the user is located over the perimeter of the mobile apparatus 202, determine if the user is located within the opening of the mobile apparatus 202, determine if the user is in contact with the cart, and/or the like.

The cart management system 636 may further include a strobing component 646 configured to cause the LED(s) 614 and/or shutters of the camera(s) 612 to strobe according to different frequencies. As noted above, the LED(s) 614 may emit light in any light spectrum (e.g., infrared, near infrared, visible, etc.). However, some items may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the LED(s) 614 to emit light in the visible spectrum. When generating image data 648 using camera(s) 612, motion blur may appear when capturing fast moving objects. However, the motion blur may be reduced or eliminated by exposing the camera(s) 612 imager for a short (e.g., sub-millisecond) durations. Accordingly, the strobing component 646 may strobe the opening and closing of shutters of the camera(s) 612 to limit the sensor exposure duration. Additionally, the strobing component 646 may cause the LEDs 614 to emit/strobe light at a particular frequency.

The cart management system 636 may also include an item-identification component 650 configured to analyze image data 648 to identify an item represented in the image data 648. The image data 648 may comprise information descriptive of a plurality of picture elements, or pixels, for one or more image frames (e.g., a still picture, multiple picture frames, video frames, etc.). The item-identification component 650 may analyze the image data 648 using various image processing techniques, or computer vision techniques. For instance, the item-identification component 650 may extract a representation of an item depicted in the image data 648 generated by at least one of the camera(s) 612. The representation may include identifying text printed on the item, colors or color schemes printed on the item, 2-D and/or 3D shapes of the item, and/or other techniques for extract a representation of the item. In some instances, the representation of the item depicted in the image data 648 may comprise a numeric representation, such as a feature vector or a set of feature vectors.

In some examples, a data store 652 stored in the memory 630 may include item data 654, which may include representations of the items offered for acquisition at the facility. The item-identification component 650 may compare the extracted represented of the item with the "gallery" or stored representations of the known items in the item data 654. In some instance, the item representation may include an indication of a barcode or SKU data for the item as recognized in, or extracted from, the image data 648. The item-identification component 650 may determine confidence level data 656 based on the comparisons with item representation in the item data 654. The item-identification component 650 may determine, and assign, confidence levels indicating how likely it is that the item represented in the image data 648 corresponds to an item from the item gallery in the item data 654. Based on the confidence level data 656, the item-identification component 650 may determine an item identifier 658 for the item in the image data 648 (or multiple item identifiers 658) that corresponds to an item in the item data 654 to which the item corresponds.

In some examples, the data store 652 may include physical-layout data 660 that is used by the item-identification component 650 to determine the item. The physical-layout data 660 may include or provide a mapping of physical locations within the physical layout of devices and objects such that the location of the mobile apparatus 202 may be utilized to determine an item stored nearby. The physical-layout data 660 may indicate the coordinates within the facility of an inventory location, items stored at that inventory location, and so forth. In examples where the mobile apparatus 202 has location determining sensors (e.g., GPS, RFID, proximity, etc.), the location sensor data may be used to determine where in the store the user is located. In such examples, the item-identification component 650 may access the physical-layout data 660 to determine if a location associated with the event is associated with a location, and confidence levels for the corresponding representations of items in the item data 654. Continuing the example above, given the location within the facility of the event and image camera data, the physical-layout data 660 may determine the items that may have been represented in generated images of the event.

The cart management system 636 may further include an event-determination component 662 to determine event-description data 664 for the item in the image data 648. The event-determination component 662 may determine if the user is adding an item to the mobile apparatus 202, removing the item from the mobile apparatus 202, etc., based on movement of the item and/or whether the item is shown in the image data 648. For instance, if the item is shown as being moved downward towards the interior of the mobile apparatus 202, and the user's hand then leaves the basket without the item, it can be determined that the user added the item to the mobile apparatus 202. Similarly, if the user's hand moves into the cart without an item, and is depicted in the image data 648 taking an item from the cart, the event-determination component 662 may determine that the user removed an item from the mobile apparatus 202.

The cart management system 636 may also include a virtual-cart management component 666 configured to manage virtual shopping cart data 668 for the mobile apparatus 202. For instance, the virtual-cart management component 666 may utilize the item data 654, event-description data 664, and confidence level data 656 to add item identifier(s) 658 to the virtual shopping cart data 668 for items that were added to the mobile apparatus 202, remove item identifier(s) 658 from the virtual shopping cart data 668 for items that were removed from the mobile apparatus 202, and track item quantity data 670 indicating quantities of particular items in the mobile apparatus 202.

The cart management system 636 may further include a user-interface component 672 configured to present user interfaces on the display based on user-interface data 674. The user interfaces may include one or more fields to present data, and/or receive touch input (or other input via a keyboard, mouse, etc.) from a user. For instance, if the item-identification component 650 is unable to determine an item identifier 658 for an item shown in the image data 648, the user-interface component 672 may receive inquiry data 676 generated by an inquiry component 678 to prompt a user for feedback to help identify the item, and/or other information (e.g., if multiple items were placed in the mobile apparatus 202). The inquiry component 678 may be configured to generate inquiry data 676 based on the information needed to identify the item. For instance, the inquiry data 676 may include a prompt to request particular feedback from the user, such as to provide input (e.g., touch input, vocal/utterance input, etc.) to identify the item, input to indicate how many items were added to the mobile apparatus 202, input to indicate whether an item was removed or added, etc. In some examples, the user-interface component 672 may present one or more images depicting items from the item data 654 that have the highest confidence levels as corresponding to the item in the image data 648, but confidence levels that are not high enough to make a final decision as to the item. For instance, the user-interface component 672 may present pictures of two different items that have high confidence levels and request that the user select or indicate the appropriate item. Additionally, or alternatively, the user-interface component 672 may present user-interface data 674 that prompts the user for feedback regarding whether or not the item was added to, or removed from the mobile apparatus 202. The user-interface component 672 may then receive response data 680 representing a selection of an item.

In some examples, the cart management system 636 may further include a locating component 682 configured to determine locations of the mobile apparatus 202 in the facility. For instance, the locating component 682 may analyze sensor data 644 collected by sensors of the mobile apparatus 202 to determine a location. In some examples, the communication interface(s) 606 may include network interfaces that configured the mobile apparatus 202 to receive or detect wireless signals (e.g., WiFi signals, Bluetooth signals, etc.) and generate sensor data 644 indicative of the signals. The locating component 682 may analyze the sensor data 644 using various techniques to identify the location of the mobile apparatus 202, such as WiFi triangulation, received signal strength indicators (RSSI), and/or other methods for analyzing wireless signals to determine a location of the mobile apparatus 202. In some instances, the facility may include various infrared (IR) or near-IR emitters at different locations that emit light according to frequencies, patterns, etc. that indicate the different locations in the facility. In such examples, the mobile apparatus 202 may include a light sensor to generate the sensor data 644 representing the IR or NIR and determine the location of the mobile apparatus 202 in the facility. In some instances, there may be visible landmarks or markers throughout the facility that indicate a location in the facility, and the locating component 682 may analyze image data 648 generated by an outward facing camera 612 to determine a location of the mobile apparatus 202. As another example, there may be various radio frequency (RF) emitters positioned throughout the store, and the mobile apparatus 202 may include an RF receiver to allow the locating component 682 to perform IR beaconing to determine the location of the mobile apparatus 202. The locating component 682 may perform one, or any combination, of the above techniques to determine a location of the mobile apparatus 202 in the facility and/or any other technique known in the art.

The locating component 682 may perform various operations based on determining the location of the mobile apparatus 202 within the facility. For instance, the locating component 682 may cause user-interface data 674 to be presented on the display that includes a map of the facility and/or directions to an item for the user of the mobile apparatus 202. Additionally, or alternatively, the locating component 682 may utilize the location of the cart, the physical-layout data 660, and/or item data 654 and "push" user interfaces to the display 218 that indicate various location-based information, such as indications of deals for items located nearby, indications of items located nearby and on the user's shopping list, and/or other user-interface data 674.

As further illustrated in the example of FIG. 6, the mobile apparatus 202 may include a weight component 684 that is configured to determine weight(s) of item(s) located within the basket 210, located within the shelf 224, and/or located on the tray 240. For a first example, the weight component 684 may receive sensor data 644 generated by sensor(s) 628, where the sensor(s) 628 include the loadcell(s) of the weight sensor associated with the basket 210. The weight component 684 may then be configured to analyze the sensor data 644 in order to determine a weight associated with the basket 210 (and/or the shelf 224). For example, the weight component 684 may be configured to analyze the sensor data 644 in order to determine the respective weight measured by each of the loadcell(s). When the weight sensor includes more than one loadcell, the weight component 684 may then be configured to determine the weight associated with the basket 210 (and/or the shelf 224) using the determined weights. For example, the weight sensor may determine the weight associated with the basket 210 (and/or the shelf 224) by adding each of the determined weights together.

For a second example, the weight component 684 may receive sensor data 644 generated by sensor(s) 628, where the sensor(s) 628 include the loadcell(s) of the weight sensor associated with the tray 240. The weight component 684 may then be configured to analyze the sensor data 644 in order to determine a weight associated with the tray. For example, the weight component 684 may be configured to analyze the sensor data 644 in order to determine the respective weight measured by each of the loadcell(s). Again, when the weight sensor includes more than one loadcell, the weight component 684 may then be configured to determine the weight associated with the tray 240 using the determined weights. For example, the weight sensor may determine the weight associated with the tray 240 by adding each of the determined weights together.

The weight component 684 may use these weights to determine the weight of the item placed within the basket 210, located within the shelf 224, and/or located on the tray 240. For example, the weight component 684 may perform the processes above in order to determine a first weight associated with the basket 210 (and/or the shelf 224) at a first time. The weight component 684 may then perform the processes above in order to determine a second weight associated with the basket 210 (and/or the shelf 224) at a second, later time. In some examples, the weight component 684 receives the sensor data 644 and/or determines the weights at the elapse of given time periods (e.g., every second, two seconds, five seconds, etc.). In some examples, the weight component 684 receives the sensor data 644 and/or determines the weights based on detecting that an item has been placed within the basket 210 (and/or the shelf 224), such as based on the output from the activity-detection component 642, the item-identification component 650, and/or the event-determination component 662. In either example, the weight component 684 may use the first weight and the second weight to determine the weight of the item.

For example, the weight component 684 may determine whether the second weight is greater than the first weight. If the weight component 684 determines that the second weight substantially equal to the first weight, then the weight component 684 may determine that a new item has not been placed within the basket 210 (and/or the shelf 224). However, if the weight component 684 determines that the second weight greater than the first weight, then the weight component 684 may determine that a new item has been placed within the basket 210 (and/or the shelf 224). In some examples, the weight component 684 may then determine the weight of the item using the weights, such as by taking the difference between the second weight and the first weight.

Additionally, or alternatively, in some examples, the weight component 684 may use the first weight and the second weight to determine that an item has been removed from the basket 210 (and/or the shelf 224). For example, the weight component 684 may determine that the second weight is less than the first weight. Based on the determination, the weight component 684 may determine that an item has been removed from the basket 210 (and/or the shelf 224). In some examples, the weight component 684 may then determine the weight of the item using the weights, such as by taking the difference between the first weight and the second weight. Additionally, if the mobile apparatus 202 already knows the weights of each of the items, the mobile apparatus 202 may determine which item was removed by matching the weight of the item removed to the weight of one of the items within the basket 210 (and/or the shelf 224).

While the examples above describe determining the weights of items placed within and/or removed from the basket 210 (and/or the shelf 224), in other examples, the weight component 684 may perform similar processes to determine the weights of items placed on the tray 240.

In some examples, the weight component 684 (and/or another component) may perform one or more processes using the weights associated with the items. For a first example, if an item is priced per unit weight, then the weight component 684 (and/or another component) may determine a price of the item using the weight and the price per unit weight. For instance, the weight component 684 may determine the price as the weight of the item multiplied by the price per unit weight. In such examples, the item data 1054 may represent the price per unit weight of the item. For instance, if the price per unit weight of the item is $1.00 for every pound, and the measured weight of the item is 10 pounds, then the weight component 684 may determine that the price of the item is $10.00. When performing processes for determining the price of the item using the weight, the mobile apparatus 202 may initially confirm that the weight of the item is accurate. For instance, the mobile apparatus 202 may use a sensor 628, such as an IMU sensor, to verify that the mobile apparatus 202 is stationary and/or located on a flat surface before performing the processes of determining the weight of the item. By verifying that the mobile apparatus 202 is stationary and/or on a flat surface, the mobile apparatus 202 may be configured to determine a more accurate weight of the item.

For a second example, the weight component 684 (and/or another component, such as the item-identification component 650) may verify an item that has been added to or removed from the mobile apparatus 202. For instance, and as discussed above, the item-identification component 650 may determine an initial identity of an item, such as by analyzing image data generated by one or more of the capture assemblies 608, using one or more of the processes described herein. The weight component 684 may then determine a weight of an item added to the mobile apparatus 202. Additionally, the weight component 684 (and/or another component, such as the item-identification component 650) may use the weight to verify the initial identity of the item. For instance, the item data 654 may represent the expected weights of items, such as the weight of the item. The weight component 684 (and/or the other component) may then compare the weight of the first item as represented by the item data 654 to the weight of the item as measured by the weight sensor(s). The weight component 684 (and/or the other component) may then verify the identity of the item when the measured weight is within a threshold percentage to the weight represented by the item data 654, or the weight component 684 (and/or the other component) may not verify the identity of the item when the measured weight is outside of the threshold weight. The threshold may include, but is not limited to, 0.1%, 0.5%, 1%, and/or any other percentage. When performing such processes, the weight component 684 (and/or the other component) are able to verify the identities of items add to the mobile apparatus 202 and/or items removed from the mobile apparatus 202.

For a third example, the weight component 684 (and/or another component) may determine a number of items added to the mobile apparatus 202. For instance, the item-identification component 650 may again determine an identity of item(s) added to the mobile apparatus 202 while the weight component 684 determines the weight of the item(s). The weight component 684 (and/or the other component) may then determine the number of the item(s) added to the mobile apparatus 202. For instance, the weight component 684 (and/or the other component) may use the item data 654 to determine the weight per unit item associated with the identified item(s). The weight component 684 (and/or the other component) may then determine the number of items using the measured weight and the weight per unit item. In some instances, the weight component 684 (and/or the other component) may determine the number of items by dividing the measured weight by the weight per unit item. For instance, if the weight per unit item is 1 pound per unit item and the measured weight is 10 pounds, then the weight component 684 (and/or the other component) may determine that the number of items is 10 items.

In some examples, the virtual-cart management component 666 may be configured to generate item weight data 686 representing the weight of the items, which the virtual-cart management component 666 may store as part of the virtual shopping cart data 668. Additionally, in some examples, the item data 654 may represent the price per unit weight of the item and/or the number of items. The mobile apparatus 202 may then be configured to provide the price of the item to the user, such as using the display 218.

As further illustrated in FIG. 6, the mobile apparatus 202 may include a state component 688. As described herein, the mobile apparatus 202 may include sensor(s) 628 (which may represent, and/or include, the sensors 310) to determine when a user is located proximate to the mobile apparatus 202, when a user is not located proximate to the mobile apparatus 202, when the mobile apparatus 202 is not nested, when the mobile apparatus 202 is nested, and/or the like. Additionally, the mobile apparatus 202 may switch between states based on these determinations. For example, the mobile apparatus 202 may operate in a first state when a user is located proximate to the mobile apparatus 202 and/or when the mobile apparatus 202 is not nested. Additionally, the mobile apparatus 202 may operate in a second, different state when a user is not located proximate to the mobile apparatus 202 and/or when the mobile apparatus 202 is nested. As such, the state component 688 may be configured to cause the mobile apparatus to switch between the states.

In some examples, the mobile apparatus 202 may use more power when operating in the first state than when operating in the second state. For example, when operating in the first state, the mobile apparatus 202 may activate at least a majority of the components of the mobile apparatus 202, such as the display 218, the capture assemblies 608, the sensor(s) 628, the communication interface(s) 606, the microphone(s) 624, the loudspeaker(s) 626, and/or the like. Additionally, when operating in the second state, the mobile apparatus 202 may deactivate one or more components of the mobile apparatus 202, such as the display 218, the capture assemblies 608, the sensor(s) 628, the communication interface(s) 606, the microphone(s) 624, the loudspeaker(s) 626, and/or the like. By deactivating the one or more components, the mobile apparatus 202 may use less power when operating in the second state.

FIG. 12 illustrates a block diagram of one or more servers 700 configured to support operation of the facility, according to at least one example.

FIG. 12 illustrates a block diagram of the one or more servers 700. The servers 700 may be physically present at the facility 100, may be accessible by the network 126, or a combination of both. The servers 700 do not require end-user knowledge of the physical location and configuration of the system that delivers the services. Common expressions associated with the servers 700 may include "on-demand computing," "software as a service (Saas)," "cloud services," "data centers," and so forth. Services provided by the servers 700 may be distributed across one or more physical or virtual devices.

The servers 700 may include one or more hardware processors 702 (processors) configured to execute one or more stored instructions. The processors 702 may comprise one or more cores. The servers 700 may include one or more input/output (I/O) interface(s) 704 to allow the processor 702 or other portions of the servers 700 to communicate with other devices. The I/O interfaces 704 may comprise Inter-Integrated Circuit (I2C), Serial Peripheral Interface bus (SPI), Universal Serial Bus (USB) as promulgated by the USB Implementers Forum, and so forth.

The servers 700 may also include one or more communication interfaces 708. The communication interfaces 708 are configured to provide communications between the servers 700 and other devices, such as the sensors 120, the interface devices, routers, and so forth. The communication interfaces 708 may include devices configured to couple to personal area networks (PANs), wired and wireless local area networks (LANs), wired and wireless wide area networks (WANs), and so forth. For example, the communication interfaces 708 may include devices compatible with Ethernet, Wi-Fi™, and so forth. The servers 700 may also include one or more busses or other internal communications hardware or software that allow for the transfer of data between the various modules and components of the servers 700.

The servers 700 may also include a power supply 740. The power supply 740 is configured to provide electrical power suitable for operating the components in the servers 700.

The servers 700 may further include one or more memories 710. The memory 710 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 710 provides storage of computer-readable instructions, data structures, program modules, and other data for the operation of the servers 700. A few example functional modules are shown stored in the memory 710, although the same functionality may alternatively be implemented in hardware, firmware, or as a system on a chip (SOC).

The memory 710 may include at least one operating system (OS) component 712. The OS component 712 is configured to manage hardware resource devices such as the I/O interfaces 704, the communication interfaces 708, and provide various services to applications or components executing on the processors 702. The OS component 712 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 710. These components may be executed as foreground applications, background tasks, daemons, and so forth. A communication component 714 may be configured to establish communications with one or more of the sensors 120, one or more of the devices used by associates, other servers 700, or other devices. The communications may be authenticated, encrypted, and so forth.

The memory 710 may store an inventory management system 716. The inventory management system 716 is configured to provide the inventory functions as described herein with regard to the inventory management system 122. For example, the inventory management system 716 may track movement of items 104 in the facility 100, generate user interface data, and so forth.

The inventory management system 716 may access information stored in one or more data stores 718 in the memory 710. The data store 718 may use a flat file, database, linked list, tree, executable code, script, or other data structure to store the information. In some implementations, the data store 718 or a portion of the data store 718 may be distributed across one or more other devices including other servers 700, network attached storage devices, and so forth.

The data store 718 may include physical layout data 720. The physical layout data 720 provides a mapping of physical locations within the physical layout of devices and objects such as the sensors 120, inventory locations 114, and so forth. The physical layout data 720 may indicate the coordinates within the facility 100 of an inventory location 114, sensors 120 within view of that inventory location 114, and so forth. For example, the physical layout data 720 may include camera data comprising one or more of a location within the facility 100 of a sensor 120(1), orientation of the sensor 120(1), the operational status, and so forth. Continuing example, the physical layout data 720 may indicate the coordinates of the sensor 120(1), pan and tilt information indicative of a direction that the field of view 130 is oriented along, whether the sensor 120(1) is operating or malfunctioning, and so forth.

In some implementations, the inventory management system 716 may access the physical layout data 720 to determine if a location associated with the incident 124 is within the field of view 130 of one or more sensors 120. Continuing the example above, given the location within the facility 100 of the incident 124 and the camera data, the inventory management system 716 may determine the sensors 120(1) that may also have generated images of the incident 124. The inventory management system 716 may also be configured to determine, based on a planogram of the facility, a potential or actual identity of an item associated with the incident 124 (e.g., what was spilled).

The item data 722 comprises information associated with the items 104. The information may include information indicative of one or more inventory locations 114 at which one or more of the items 104 are stored. The item data 722 may also include event data, SKU or other product identifier, price, quantity on hand, weight, expiration date, images of the item 104, detail description information, ratings, ranking, and so forth. Still, in some instances, the item data 722 may include device data that associated items with devices that are used to track the locations of the items within the facility 100. The inventory management system 716 may store information associated with inventory management functions in the item data 722.

The data store 718 may also include sensor data 724. The sensor data 724 comprises information acquired from, or based on, the one or more sensors 120. For example, the sensor data 724 may comprise 3D information about an object in the facility 100. As described above, the sensors 120 may include a sensor 120(1), which is configured to acquire one or more images. These images may be stored as the image data 726. The image data 726 may comprise information descriptive of a plurality of picture elements or pixels. Non-image data may comprise information from other sensors 120, such as input from microphones, weight sensors, and so forth.

User data 730 may also be stored in the data store 718. The user data 730 may include identity data, information indicative of a profile, purchase history, location data, demographic data, and so forth. Individual users 116 or groups of users 116 may selectively provide user data 730 for use by the server(s) 128. The individual users 116 or groups of users 116 may also authorize collection of the user data 730 during use of the facility 100 or access to user data 730 obtained from other systems. For example, the user 116 may opt-in to collection of the user data 730 to receive enhanced services while using the facility 100.

In some implementations, the user data 730 may include information designating a user 116 for special handling. For example, the user data 730 may indicate that a particular user 116 has been associated with an increased number of errors with respect to output data 756. The inventory management system 716 may be configured to use this information to apply additional scrutiny to the incidents 124 associated with this user 116. For example, incidents 124 that include an item 104 having a price or result above the threshold amount may be provided to the associates for processing regardless of the determined level of confidence in the output data 756 as generated by the automated system.

The inventory management system 716 may include one or more of a location component 732, identification component 734, event-determination component 736, and inquiry component 738, potentially amongst other components.

The location component 732 functions to locate items or users within the environment of the facility to allow the inventory management system 716 to assign certain events to the correct users. That is, the location component 732 may assign unique identifiers to users as they enter the facility and, with the users' consent, may locate the users throughout the facility 100 over the time they remain in the facility 100. The location component 732 may perform this locating using sensor data 724, such as the image data 726. For example, the location component 732 may receive the image data 726 and analyze the image data 726 to identify users from the images. After identifying a particular user within the facility, the location component 732 may then locate the user within the images as the user moves throughout the facility 100. Further, should the location component 732 temporarily "lose" a particular user, the location component 732 may again attempt to identify the users within the facility based on facial recognition, and/or using other techniques such as voice recognition, or the like.

Therefore, upon receiving the indication of the time and location of the event in question, the location component 732 may query the data store 718 to determine which one or more users were at or within a threshold distance of the location of the event at the particular time of the event. Further, the location component 732 may assign different confidence levels to different users, with the confidence levels indicating how likely it is that each corresponding user is the user that is in fact associated with the event of interest.

The location component 732 may access the sensor data 724 in order to determine this location data of the user and/or items. The location data provides information indicative of a location of an object, such as the item 104, the user 116, the tote 118, and so forth. The location may be absolute with respect to the facility 100 or relative to another object or point of reference. Absolute terms may comprise a latitude, longitude, and altitude with respect to a geodetic reference point. Relative terms may include a location of 30.4 meters (m) along an x-axis and 10.2 m along a y-axis as designated by a floor plan of the facility 100, 10.2 m from an inventory location 114 along a heading of 110°, and so forth. For example, the location data may indicate that the user 116(1) is 210.2 m along the aisle 112(1) and standing in front of the inventory location 114. In comparison, a relative location may indicate that the user 116(1) is 32 cm from the tote 118 at a heading of 73° with respect to the tote 118. The location data may include orientation information, such as which direction the user 116 is facing. The orientation may be determined by the relative direction the user's body is facing. In some implementations, the orientation may be relative to the interface device. Continuing the example, the location data may indicate that the user 116(1) is oriented with a heading of 0°, or looking north. In another example, the location data may indicate that the user 116 is facing towards the interface device.

The identification component 734 is configured to identify an object. In one implementation, the identification component 734 may be configured to identify an item 104. In another implementation, the identification component 734 may be configured to identify an identifier associated with the user 116. For example, the identification component 734 may process the image data 726 and determine the identity data of the user 116 depicted in the images by comparing the characteristics in the image data 726 with previously stored results. The identification component 734 may also access data from other sensors 120, such as from an RFID reader, an RF receiver, fingerprint sensors, and so forth.

The event-determination component 736 is configured to process the sensor data 724 and generate output data 756, and may include components described above. The event-determination component 736 may access information stored in the data store 718 including, but not limited to, event-description data 742, confidence levels 744, or threshold values. In some instances, the event-determination component 736 may be configured to perform some or all of the techniques described above with regards to the event-determination component 736. For instance, the event-determination component 736 may be configured to create and utilize event classifiers for identifying events (e.g., predefined activity) within image data, potentially without use of other sensor data acquired by other sensors in the environment.

The event-description data 742 comprises information indicative of one or more incidents 124. For example, the event-description data 742 may comprise predefined profiles that designate movement of an item 104 from an inventory location 114 with the incident 124 of "pick". The event-description data 742 may be manually generated or automatically generated. The event-description data 742 may include data indicative of triggers associated with events occurring in the facility 100. An event may be determined as occurring upon detection of the trigger. For example, sensor data 724 such as a change in weight from a sensor 120 at an inventory location 114 may trigger detection of an event of an item 104 being added or removed from the inventory location 114. In another example, the trigger may comprise an image of the user 116 reaching a hand toward the inventory location 114. In yet another example, the trigger may comprise two or more users 116 approaching to within a threshold distance of one another.

The event-determination component 736 may process the sensor data 724 using one or more techniques including, but not limited to, artificial neural networks, classifiers, decision trees, support vector machines, Bayesian networks, and so forth. For example, the event-determination component 736 may use a decision tree to determine occurrence of the "pick" incident 124 based on sensor data 724. The event-determination component 736 may further use the sensor data 724 to determine one or more tentative results 748. The one or more tentative results 748 comprise data associated with the incident 124. For example, where the incident 124 comprises a disambiguation of users 116, the tentative results 748 may comprise a list of possible user identities. In another example, where the incident 124 comprises a disambiguation between items, the tentative results 748 may comprise a list of possible item identifiers. In some implementations, the tentative result 748 may indicate the possible action. For example, the action may comprise the user 116 picking, placing, moving an item 104, damaging an item 104, providing gestural input, and so forth.

In some implementations, the tentative results 748 may be generated by other components. For example, the tentative results 748 such as one or more possible identities or locations of the user 116 involved in the incident 124 may be generated by the location component 732. In another example, the tentative results 748 such as possible items 104 that may have been involved in the incident 124 may be generated by the identification component 734.

The event-determination component 736 may be configured to provide a confidence level 744 associated with the determination of the tentative results 748. The confidence level 744 provides indicia as to the expected level of accuracy of the tentative result 748. For example, a low confidence level may indicate that the tentative result 748 has a low probability of corresponding to the actual circumstances of the incident 124. In comparison, a high confidence level may indicate that the tentative result 748 has a high probability of corresponding to the actual circumstances of the incident 124.

In some implementations, the tentative results 748 having confidence levels 744 that exceed the threshold may be deemed to be sufficiently accurate and thus may be used as the output data 756. For example, the event-determination component 736 may provide tentative results 748 indicative of the three possible items 104(1), 104(2), and 104(3) corresponding to the "pick" incident 124. The confidence levels 744 associated with the possible items 104(1), 104(2), and 104(3) may be 210%, 70%, 102%, respectively. Continuing the example, the threshold value 1046 may be set such that confidence level 744 of 100% are deemed to be sufficiently accurate. As a result, the event-determination component 736 may designate the "pick" incident 124 as involving item 104(3).

The inquiry component 738 may be configured to use at least a portion of the sensor data 724 associated with the incident 124 to generate inquiry data 750. In some implementations, the inquiry data 750 may include one or more of the tentative results 748 or supplemental data 752. The inquiry component 738 may be configured to provide inquiry data 750 to one or more devices associated with one or more human associates.

An associate user interface is presented on the respective devices of associates. The associate may generate response data 754 by selecting a tentative result 748, entering new information, indicating that they are unable to answer the inquiry, and so forth.

The supplemental data 752 comprises information associated with the incident 124 or that may be useful in interpreting the sensor data 724. For example, the supplemental data 752 may comprise previously stored images of the items 104. In another example, the supplemental data 752 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 726 during presentation to an associate.

The inquiry component 738 processes the response data 754 provided by the one or more associates. The processing may include calculating one or more statistical results associated with the response data 754. For example, statistical results may include a count of the number of times associates selected a tentative result 748, determination of a percentage of the associates that selected a tentative result 748, and so forth.

The inquiry component 738 is configured to generate the output data 756 based at least in part on the response data 754. For example, given that a majority of the associates returned response data 754 indicating that the item 104 associated with the "pick" incident 124 is item 104(10), the output data 756 may indicate that the item 104(10) was picked.

The inquiry component 738 may be configured to selectively distribute inquiries to particular associates. For example, some associates may be better suited to answering particular types of inquiries. Performance data, such as statistical data about the performance of the associates, may be determined by the inquiry component 738 from the response data 754 provided by the associates. For example, information indicative of a percentage of different inquiries in which the particular associate selected response data 754 that disagreed with the majority of associates may be maintained. In some implementations, test or practice inquiry data having a previously known correct answer may be provided to the associate for training or quality assurance purposes. The determination of the set of associates to use may be based at least in part on the performance data.

By using the inquiry component 738, the event-determination component 736 may be able to provide high reliability output data 756 that accurately represents the incident 124. The output data 756 generated by the inquiry component 738 from the response data 754 may also be used to further train the automated systems used by the inventory management system 716. For example, the sensor data 724 and the output data 756, based on response data 754, may be provided to one or more of the components of the inventory management system 716 for training in process improvement. Continuing the example, this information may be provided to an artificial neural network, Bayesian network, and so forth, to further train these systems such that the confidence level 744 and the tentative results 748 produced in the future for the same or similar input is improved. Finally, as FIG. 13 illustrates, the servers 700 may store and/or utilize other data 760.

In some instances, the servers 700 may further store the timestamp data 758, timestamp data 758 representing locations of users 116 over time, and other data 760.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

The invention claimed is:

1. A system comprising:
one or more processors; and
one or more computer-readable media storing instructions that, when executed by the one or more processors, cause the one or more processors to perform operations comprising:
receiving, from one or more cameras of a facility, facility sensor data associated with one or more locations within the facility;
determining a first location for a first shopping cart operating within the facility using the facility sensor data;
receiving, from a first electronic device associated with the first shopping cart, first cart sensor data associated with a first environment around the first location at a first time;
determining a first spill location based at least in part on the facility sensor data, the first location, and the first cart sensor data;
determining a first confidence score associated with the first spill location;
receiving, from a second electronic device associated with a second shopping cart operating within the facility, second cart sensor data associated with a second environment at a second time;

determining a second spill location based at least in part on a second location of the second shopping cart and the second cart sensor data;

determining, in response to the first spill location being within a threshold distance of the second spill location, a second confidence score associated with the first spill location; and outputting, in response to the second confidence score being above a threshold, a notification to a computing device associated with the facility.

2. The system of claim 1, wherein the first shopping cart comprises a camera, and wherein receiving the first cart sensor data comprises receiving image data from the first electronic device that is output from the camera.

3. The system of claim 1, wherein the first shopping cart comprises a camera, and wherein receiving the first cart sensor data comprises image data from the first electronic device that is output from the camera, and wherein the operations further comprise:

determining a first spill type associated with the first spill location based at least in part on the image data.

4. A method comprising:

receiving, from one or more cameras of a facility, facility sensor data associated with one or more locations within the facility;

determining a first location for a first shopping cart operating within the facility using the facility sensor data;

receiving, from a first electronic device associated with the first shopping cart, first cart sensor data associated with a first environment around the first location at a first time;

determining an incident location based at least in part on the facility sensor data, the first location, and the first cart sensor data, the incident location associated with an incident;

determining an incident type based at least in part on the facility sensor data, the first location, and the first cart sensor data;

determining a confidence score associated with the incident location and the incident type; and outputting, in response to the confidence score being above a threshold, a notification of the incident to a computing device associated with the facility.

5. The method as recited in claim 4, wherein the first electronic device comprises a camera, the first cart sensor data comprises image data including representations of items within the facility, and determining the incident location comprises:

determining an item identity for an item of the items; and determining an item location based at least in part on a planogram associated with the facility, wherein the incident location is further based at least in part on the item location.

6. The method as recited in claim 4, wherein the notification comprises the incident type, the incident location, and one or more remediation steps for addressing the incident.

7. The method as recited in claim 4, further comprising:

receiving, from a second electronic device associated with a second shopping cart operating within the facility, second cart sensor data associated with the first environment around the first location at a second time;

determining a second incident location based at least in part on the facility sensor data, the first location, and the second cart sensor data; and increasing the confidence score in response to the second incident location being within a threshold distance of the incident location.

8. The method as recited in claim 7, further comprising:

determining a second incident type for the second incident location based at least in part on the facility sensor data, the second incident location, and the second cart sensor data; and increasing the confidence score in response to the second incident type matching the incident type.

9. The method as recited in claim 4, wherein the outputting the notification comprises outputting an alert to one or more electronic devices associated with one or more additional shopping carts, the alert comprising a warning associated with the incident location.

10. The method as recited in claim 9, wherein the one or more additional shopping carts are determined based at least in part on locations associated with the one or more additional shopping carts being within a threshold distance of the incident location.

11. The method as recited in claim 9, wherein outputting the alert to the one or more electronic devices is based at least in part on the incident type.

12. The method as recited in claim 9, further comprising:

receiving a notification indicating resolution of the incident; and syncing the notification with the one or more electronic devices to cancel the alert.

13. The method as recited in claim 4, wherein the incident type comprises a spill, the method further comprising:

determining a type of spill associated with the spill based at least in part on the facility sensor data or the first cart sensor data, and wherein the notification comprises identification of one or more products for cleaning the spill based at least in part on the type of spill.

14. A system comprising:

one or more processors; and one or more computer-readable media storing instructions that, when executed by the one or more processors, cause the one or more processors to perform operations comprising:

receiving, from one or more cameras of a facility, facility sensor data associated with one or more locations within the facility;

determining a first location for a first shopping cart operating within the facility using the facility sensor data;

receiving, from a first electronic device associated with the first shopping cart, first cart sensor data associated with a first environment around the first location at a first time;

determining an incident location based at least in part on the facility sensor data, the first location, and the first cart sensor data, the incident location associated with an incident;

determining an incident type based at least in part on the facility sensor data, the first location, and the first cart sensor data;

determining a confidence score associated with the incident location and the incident type; and outputting, in response to the confidence score being above a threshold, a notification of the incident to a computing device associated with the facility.

15. The system as recited in claim 14, wherein the operations further comprise:

receiving, from a second electronic device associated with a second shopping cart operating within the facility, second cart sensor data associated with the first environment around the first location at a second time;

determining a second incident location based at least in part on the facility sensor data, the first location, and the second cart sensor data; and increasing the confidence score in response to the second incident location being within a threshold distance of the incident location.

16. The system as recited in claim 14, wherein the first cart sensor data comprises image data including representations of items within the facility, and determining the incident location comprises:

determining an item identity for an item of the items; and determining an item location based at least in part on a planogram associated with the facility, wherein the incident location is further based at least in part on the item location.

17. The method of claim 4, further comprising:

receiving, from one or more scanner sensors of the first shopping cart, additional cart sensor data associated with the first environment, wherein determining the incident type is further based at least in part on the additional cart sensor data.

18. The method of claim 4, wherein the first cart sensor data comprises camera sensor data, weight sensor data, or scanner sensor data.

19. The method of claim 4, wherein the computing device is further associated with a user.

20. The method of claim 4, wherein the facility sensor data further comprises weight sensor data generated by a weight sensor, radio frequency data generated by a radio frequency receive, temperature data generated by a temperature sensor, humidity data generated by a humidity sensor, or vibration data generated by a vibration sensor.

\* \* \* \* \*